US012752248B1

(12) United States Patent
Slocum et al.

(10) Patent No.: US 12,752,248 B1
(45) Date of Patent: Oct. 6, 2026

(54) CONTAINERIZED PROCESSING OF ACTIVATED ALUMINUM

(71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 147 days.

(21) Appl. No.: 18/919,079

(22) Filed: Oct. 17, 2024

Related U.S. Application Data

(63) Continuation of application No. 18/386,591, filed on Nov. 2, 2023, now Pat. No. 12,145,142.

(60) Provisional application No. 63/586,306, filed on Sep. 28, 2023, provisional application No. 63/504,685, filed on May 26, 2023, provisional application No.
(Continued)

(51) Int. Cl.

| | |
|---|---|
| ***B01J 7/00*** | (2006.01) |
| ***B01J 6/00*** | (2006.01) |
| ***B01J 7/02*** | (2006.01) |
| ***B01J 19/00*** | (2006.01) |
| ***C01B 3/08*** | (2026.01) |
| ***C01F 7/00*** | (2022.01) |

(52) U.S. Cl.
CPC . *B01J 7/02* (2013.01); *B01J 6/00* (2013.01); *B01J 19/0053* (2013.01); *C01B 3/08* (2013.01); *C01F 7/00* (2013.01); *Y02E 60/36* (2013.01)

(58) Field of Classification Search
CPC .. B01J 7/02; B01J 6/00; B01J 19/0053; C01B 3/08; C01F 7/00; Y02E 60/36
See application file for complete search history.

(56) References Cited

U.S. PATENT DOCUMENTS 2,384,720 A 9/1945 Babcock et al.
3,204,320 A 9/1965 Eckstein et al.
(Continued)

FOREIGN PATENT DOCUMENTS

CN 104289645 A 1/2015
CN 109678109 A 4/2019
(Continued)

OTHER PUBLICATIONS

U.S. Patent and Trademark Office, "Notice of Allowance and Issue Fee(s) Due," issued in related U.S. Appl. No. 17/351,079 dated Apr. 5, 2022 (25 pages).
(Continued)

*Primary Examiner* — Lessanework Seifu
(74) *Attorney, Agent, or Firm* — The Marbury Law Group, PLLC

(57) ABSTRACT

According to one aspect, a system for processing material to form activated aluminum, may include a thermal reactor defining a chamber, a support disposed outside of the chamber, a shaft having a first portion and a second portion defining a longitudinal axis, the first portion disposed on the support and the second portion disposed in the chamber, and the shaft rotatable about the longitudinal axis, a fixture supported on the second portion of the shaft in the chamber, and a restraint releasably securable to the second portion of the shaft, the restraint and the fixture spaced relative to one another to hold a plurality of kits of material therebetween as the shaft rotates the fixture, the restraint, and the plurality of kits of material, about the longitudinal axis, in the chamber.

18 Claims, 28 Drawing Sheets

Related U.S. Application Data

63/437,591, filed on Jan. 6, 2023, provisional application No. 63/421,944, filed on Nov. 2, 2022.

(56) References Cited

U.S. PATENT DOCUMENTS

| | | | |
|---|---|---|---|
| 3,225,508 | A | 12/1965 | Simon |
| 3,878,081 | A | 4/1975 | Reding et al. |
| 3,993,595 | A | 11/1976 | Merkl |
| 4,280,288 | A | 7/1981 | Corfa et al. |
| 4,358,291 | A | 11/1982 | Cuomo et al. |
| 4,446,636 | A | 5/1984 | Weinert |
| 4,586,456 | A | 5/1986 | Forward |
| 4,770,848 | A | 9/1988 | Ghosh et al. |
| 5,372,617 | A | 12/1994 | Kerrebrock et al. |
| 5,481,788 | A | 1/1996 | Simon et al. |
| 5,494,538 | A | 2/1996 | Kirillov et al. |
| 5,620,652 | A | 4/1997 | Tack et al. |
| 5,707,499 | A | 1/1998 | Joshi et al. |
| 6,040,085 | A | 3/2000 | Cheu et al. |
| 6,389,942 | B1 | 5/2002 | Matsumoto et al. |
| 6,506,360 | B1 | 1/2003 | Andersen et al. |
| 6,648,272 | B1 | 11/2003 | Kothmann |
| 7,364,815 | B2 | 4/2008 | Nakagawa et al. |
| 7,666,386 | B2 | 2/2010 | Withers-Kirby et al. |
| 7,803,349 | B1 | 9/2010 | Muradov |
| 8,225,927 | B2 | 7/2012 | Narendrnath et al. |
| 8,418,435 | B2 | 4/2013 | Hatoum |
| 8,697,027 | B2 | 4/2014 | Uzhinsky et al. |
| 8,974,765 | B2 | 3/2015 | Boyle et al. |
| 9,624,103 | B1 | 4/2017 | Woodall et al. |
| 10,258,950 | B2 | 4/2019 | Kmetich et al. |
| 10,745,789 | B2 | 8/2020 | Slocum |
| 11,111,141 | B1 | 9/2021 | Slocum et al. |
| 11,148,840 | B1 | 10/2021 | Slocum et al. |
| 11,148,947 | B1 | 10/2021 | Slocum et al. |
| 11,268,180 | B2 | 3/2022 | Slocum |
| 11,312,466 | B1 | 4/2022 | Slocum et al. |
| 11,332,366 | B2 | 5/2022 | Slocum et al. |
| 11,603,587 | B2 | 3/2023 | Slocum |
| 11,629,396 | B2 | 4/2023 | Slocum |
| 11,661,339 | B1 | 5/2023 | Mahar et al. |
| 11,708,631 | B2 | 7/2023 | Slocum |
| 11,767,137 | B1 | 9/2023 | Slocum et al. |
| 11,840,451 | B2 | 12/2023 | Slocum et al. |
| 11,986,877 | B1 | 5/2024 | Slocum et al. |
| 2001/0054459 | A1 | 12/2001 | Hostetler |
| 2002/0088178 | A1 | 7/2002 | Davis |
| 2003/0024323 | A1 | 2/2003 | Wang et al. |
| 2003/0062444 | A1 | 4/2003 | Goodey |
| 2007/0057116 | A1 | 3/2007 | Sinsabaugh et al. |
| 2007/0181224 | A1 | 8/2007 | Marya et al. |
| 2007/0217972 | A1 | 9/2007 | Greenberg et al. |
| 2008/0063597 | A1 | 3/2008 | Woodall et al. |
| 2008/0193806 | A1 | 8/2008 | Kulakov |
| 2009/0208404 | A1 | 8/2009 | Itoh |
| 2010/0028255 | A1 | 2/2010 | Hatoum |
| 2010/0061923 | A1 | 3/2010 | Reddy |
| 2010/0112396 | A1 | 5/2010 | Goldstein |
| 2012/0018116 | A1 | 1/2012 | Mathur et al. |
| 2012/0052001 | A1 | 3/2012 | Woodall et al. |
| 2012/0100443 | A1 | 4/2012 | Braithwaite et al. |
| 2012/0107228 | A1 | 5/2012 | Ishida et al. |
| 2012/0318660 | A1 | 12/2012 | Cohly et al. |
| 2014/0231132 | A1 | 8/2014 | Watanabe |
| 2014/0231281 | A1 | 8/2014 | Young et al. |
| 2015/0204486 | A1 | 7/2015 | Hoffmann |
| 2015/0258298 | A1 | 9/2015 | Satoh et al. |
| 2016/0355918 | A1 | 12/2016 | Slocum |
| 2017/0022075 | A1 | 1/2017 | Ritchie et al. |
| 2017/0022078 | A1 | 1/2017 | Fukuoka |
| 2017/0101323 | A1 | 4/2017 | Vyas et al. |
| 2018/0062190 | A1 | 3/2018 | Redwine |
| 2019/0024216 | A1 | 1/2019 | Giri et al. |
| 2019/0077510 | A1 | 3/2019 | Panas et al. |
| 2019/0193913 | A1 | 6/2019 | Takehara |
| 2019/0341637 | A1 | 11/2019 | Fine et al. |
| 2020/0199727 | A1 | 6/2020 | Slocum |
| 2020/0199728 | A1 | 6/2020 | Slocum |
| 2020/0262536 | A1 | 8/2020 | Deakin |
| 2020/0325045 | A1 | 10/2020 | Fukuoka |
| 2021/0061488 | A1 | 3/2021 | Smithers et al. |
| 2021/0115547 | A1 | 4/2021 | Slocum |
| 2021/0276865 | A1 | 9/2021 | Merouch |
| 2021/0276866 | A1 | 9/2021 | Merouch |
| 2022/0074023 | A1 | 3/2022 | Godart |
| 2022/0305483 | A1 | 9/2022 | Kelley et al. |

FOREIGN PATENT DOCUMENTS

| | | | |
|---|---|---|---|
| CN | 112935147 | A | 6/2021 |
| EP | 1975479 | A2 | 10/2008 |
| EP | 2980352 | A1 | 2/2016 |
| GB | 2356184 | A | 5/2001 |
| JP | 2004174301 | A | 6/2004 |
| JP | 2004243151 | A | 9/2004 |
| JP | 2009221097 | A | 10/2009 |
| RU | 2131841 | C1 | 6/1999 |
| WO | 2009034479 | A1 | 3/2009 |
| WO | 2012110136 | A1 | 8/2012 |
| WO | 2015005921 | A1 | 1/2015 |
| WO | 2015077225 | A1 | 5/2015 |
| WO | 2016196718 | A1 | 12/2016 |
| WO | 2021034805 | A1 | 2/2021 |
| WO | 2021119628 | A1 | 6/2021 |

OTHER PUBLICATIONS

U.S. Patent and Trademark Office, "Restriction Requirement," issued in related U.S. Appl. No. 17/730,475 dated Jul. 6, 2022 (6 pages).

U.S. Patent and Trademark Office, "Non-final Office Action," issued in related U.S. Appl. No. 17/730,475 dated Sep. 1, 2022 (36 pages).

U.S. Patent and Trademark Office, "Final Office Action," issued in related U.S. Appl. No. 17/730,475 dated Mar. 31, 2023 (6 pages).

U.S. Patent and Trademark Office, "Notice of Allowance and Issue Fee(s) Due," issued in related U.S. Appl. No. 17/730,475 dated Apr. 19, 2023 (12 pages).

U.S. Patent and Trademark Office, "Notice of Allowance and Issue Fee(s) Due," issued in related U.S. Appl. No. 17/730,475 dated Aug. 3, 2023 (13 pages).

U.S. Patent and Trademark Office, "Restriction Requirement," issued in related U.S. Appl. No. 17/888,421, dated Mar. 22, 2023 (6 pages).

U.S. Patent and Trademark Office, "Non-Final Office Action," issued in related U.S. Appl. No. 17/888,421, dated Jul. 10, 2023 (6 pages).

U.S. Patent and Trademark Office, "Final Office Action," issued in related U.S. Appl. No. 17/888,421, dated Feb. 7, 2024 (23 pages).

Wan, B., et al. "Review of Solid State recyling of aluminum chips," ELSEVIER, Resources, Conservation & Recycling 125, pp. 37-47 (2017).

Merouh, Lauren, "Effects of Doping and Microstructural Variables on Hydrogen Generated Via Aluminum-Water Reactions Enabled by a Liquid Metal," Ph.D. Thesis, Massachusetts Institute of Technology, Sep. 2020, (127 pages).

Chao, "Maximized On-Demand Hydrogen . . ." Chao, et al., "Maximized On-Demand Hydrogen Generator Design", Advanced Materials Research, vols. 690-693, May 2013, pp. 954-961 (9 pages).

Godart, Peter, "Design of an aluminum-powered reverse osmosis desalination system for disaster relief," Massachusetts Institute of Technology, Dept. of Mechanical Engineering, dated May 22, 2019 (105 pages).

Godart, Peter, "Mechanisms of liquid-metal-activated aluminum-water reactions and their application," Massachusetts Institute of Technology, Dept. of Mechanical Engineering, (Sep. 2021) dated Aug. 6, 2021 (351 pages).

European Patent Office, "Extended European Search Report," issued in related European Patent Application No. 16804381.8 dated Oct. 26, 2018 (7 pages).

(56) References Cited

OTHER PUBLICATIONS

U.S. Patent and Trademark Office, "International Preliminary Report on Patentability," issued in related International Patent Application No. PCT/US2016/035397 dated Dec. 5, 2017 (11 pages).
U.S. Patent and Trademark Office, "International Search Report and Written Opinion," issued in related International Patent Application No. PCT/US2016/035397 dated Sep. 7, 2016 (13 pages).
European Patent Office, "International Search Report and Written Opinion," issued in related International Patent Application No. PCT/US2021/037948 dated Nov. 5, 2021 (28 pages).
European Patent Office, "International Preliminary Report on Patentability," issued in related International Patent Application No. PCT/US2021/037948 dated Feb. 23, 2023 (7 pages).
U.S. Patent and Trademark Office, "Non-Final Office Action," issued in related U.S. Appl. No. 15/171,053 dated Jun. 6, 2018 (19 pages).
U.S. Patent and Trademark Office, "Final Office Action," issued in related U.S. Appl. No. 15/171,053 dated Mar. 5, 2019 (40 pages).
U.S. Patent and Trademark Office, "Non-Final Office Action," issued in related U.S. Appl. No. 15/171,053 dated Sep. 19, 2019 (28 pages).
U.S. Patent and Trademark Office, "Notice of Allowance and Issue Fee(s) Due," issued in related U.S. Appl. No. 15/171,053 dated Feb. 10, 2020 (12 pages).
U.S. Patent and Trademark Office, "Supplemental Notice of Allowability," issued in related U.S. Appl. No. 15/171,053 dated Jul. 16, 2020 (4 pages).
U.S. Patent and Trademark Office, "Non-Final Office Action," issued in related U.S. Appl. No. 16/804,643, dated Apr. 15, 2021 (22 pages).
U.S. Patent and Trademark Office, "Final Office Action," issued in related U.S. Appl. No. 16/804,643, dated Oct. 28, 2021 (14 pages).
U.S. Patent and Trademark Office, "Non-Final Office Action," issued in related U.S. Appl. No. 16/804,643, dated Jun. 9, 2022 (15 pages).
U.S. Patent and Trademark Office, "Notice of Allowance and Issue Fee(s) Due," issued in related U.S. Appl. No. 16/804,643, dated Jan. 30, 2023 (16 pages).
U.S. Patent and Trademark Office, "Non-Final Office Action," issued in related U.S. Appl. No. 16/804,676 dated Jul. 21, 2021 (17 pages).
U.S. Patent and Trademark Office, "Notice of Allowance and Issue Fee(s) Due," issued in related U.S. Appl. No. 16/804,676 dated Jan. 25, 2022 (25 pages).
U.S. Patent and Trademark Office, "Non-Final Office Action," issued in related U.S. Appl. No. 17/134,757 dated Apr. 1, 2021 (19 pages).
U.S. Patent and Trademark Office, "Final Office," issued in related U.S. Appl. No. 17/134,757 dated Aug. 13, 2021 (11 pages).
U.S. Patent and Trademark Office, "Non-Final Office Action," issued in related U.S. Appl. No. 17/134,757 dated Nov. 26, 2021 (20 pages).
U.S. Patent and Trademark Office, "Final Office," issued in related U.S. Appl. No. 17/134,757 dated Jun. 30, 2022 (16 pages).
U.S. Patent and Trademark Office, "Notice of Allowance and Issue Fee(s) Due," issued in related U.S. Appl. No. 17/134,757 dated Mar. 3, 2023 (21 pages).
U.S. Patent and Trademark Office, "Non-Final Office Action," issued in related U.S. Appl. No. 17/499,264 dated Dec. 9, 2021 (25 pages).
U.S. Patent and Trademark Office, "Final Office Action," issued in related U.S. Appl. No. 17/499,264 dated Jul. 14, 2022 (17 pages).
U.S. Patent and Trademark Office, "Notice of Allowance and Issue Fee(s) Due," issued in related U.S. Appl. No. 17/499,264 dated Mar. 8, 2023 (8 pages).
U.S. Patent and Trademark Office, "Restriction Requirement," issued in related U.S. Appl. No. 17/118,335 dated May 30, 2023 (6 pages).
U.S. Patent and Trademark Office, "Non-Final Office Action," issued in related U.S. Appl. No. 17/118,335 dated Oct. 2, 2023 (26 pages).
U.S. Patent and Trademark Office, "Notice of Allowance and Fee(s) Due," issued in related U.S. Appl. No. 17/118,335 dated Dec. 8, 2023 (5 pages).
U.S. Patent and Trademark Office, "Notice of Allowance and Fee(s) Due," issued in related U.S. Appl. No. 17/118,335 dated Jan. 28, 2024 (14 pages).
U.S. Patent and Trademark Office, "Notice of Allowance and Fee(s) Due," issued in related U.S. Appl. No. 17/315,163, dated Jul. 20, 2021 (20 pages).
U.S. Patent and Trademark Office, "Notice of Allowance and Fee(s) Due," issued in related U.S. Patent Application No. 17/315, 163, dated Sep. 2, 2021 (3 pages).
U.S. Patent and Trademark Office, "Notice of Allowance and Issue Fee(s) Due," issued in related U.S. Appl. No. 17/487,865 dated Feb. 3, 2023 (30 pages).
U.S. Patent and Trademark Office, "Notice of Allowance and Issue Fee(s) Due," issued in related U.S. Appl. No. 17/487,865 dated Mar. 14, 2023 (14 pages).
U.S. Patent and Trademark Office, "Notice of Allowance and Issue Fee(s) Due," issued in related U.S. Appl. No. 17/487,865 dated Jul. 12, 2023 (14 pages).
U.S. Patent and Trademark Office, "Non-final Office Action," issued in related U.S. Appl. No. 17/351,079 dated Nov. 8, 2021 (45 pages).
Metals Handbook, 10th Edition, vol. 2, Properties and Selection: Nonferrous Alloys and Special-Purpose Materials, pp. 145-146, Oct. 1990.
Rajagopalan, et al. "Atomic-scale analysis of liquid-gallium embrittlement of aluminum grain boundaries," Acta Materialia, vol. 73, pp. 312-325, Jul. 2014.
Choi, et al. "Mechanism of Hydrogen Generation via Water Reaction with Aluminum Alloys," Generating hydrogen on demand, Jun. 28, 2010 (4 pages).
Parmuzina, et al. "Oxidation of activated aluminum with water as a method for hydrogen generation," Russian Chemical Bulletin, International Edition, vol. 58, No. 3, pp. 493-989, Mar. 2009.
Vitos, L., et al. "The Surface Energy of Metals," Elsevier Surface Science 411, pp. 186-202 (1998).
Lee, L., (edited by), "Fundamentals of Adhesion," pp. 333-336 (1991).
Ansara, et al. "Thermodynamic Analysis of the Ga—In, Al—GA, Al—In and the Al—GA—In Systems," Calphad, vol. 2, No. 3, pp. 187-196 (1978).
Lu, Y., et al. "Total Phenolic, flavonoid content, and antioxidant activity of flour, noodles, and steamed bread made from different colored wheat grains by three milling methods," The CROP Journal 3, pp. 328-334 (2015).
Higdon, J., "Flavonoids," Oregon State University, Linus Plu, Y., et al. "Total Phenolic, flavonoid content, and antioxidant activity of flour, noodles, and steamed bread made from different colored wheat grains by three milling methods," The CROP Journal 3, pp. 328-334, 2015. auling Institute, Micronutrient Information Center 2005, (50 pages) Copyright 2005-2021.
Nielsen et al."Flavonoids in human urine . . . " Nielsen, et al., "Flavonoids in Human Urine as Biomarkers for Intake of Fruits and Vegetables", Cancer Epidemiology, Biomarkers & Prevention, vol. 11, May 2002, pp. 459-466 (9 pages).
Mennen et al. "Urinary flavonoids . . . " Mennen, et al., "Urinary flavonoids and phenolic acids as biomarkers of intake for polyphenol-rich foods", British Journal of Nutrition (2006), vol. 96, pp. 191-198 (8 pages).

CONTAINERIZED PROCESSING OF ACTIVATED ALUMINUM

CROSS-REFERENCE TO RELATED APPLICATIONS

This application is a continuation of U.S. patent application Ser. No. 18/386,591, filed Nov. 2, 2023, which claims priority to U.S. Provisional Application 63/421,944, filed Nov. 2, 2022, to U.S. Provisional Application 63/437,591, filed Jan. 6, 2023, to U.S. Provisional Application 63/504,685, filed May 26, 2023, and to U.S. Provisional Application 63/586,306, filed Sep. 28, 2023, with the entire contents of each of these applications hereby incorporated herein by reference.

BACKGROUND

Under normal environmental conditions, aluminum is covered with a protective oxide coating. This oxide coating forms rapidly in air and is stable. Thus, although aluminum itself can be reactive with water to produce hydrogen and heat, the oxide coating on aluminum is an obstacle to using aluminum as a source of energy.

To overcome the impact of aluminum oxide on the water-reactivity of aluminum, aluminum can be treated to be in an activated form that yields a large amount of hydrogen and heat when reacted with water. With this combination of energy density and water-reactivity, activated aluminum is a volumetrically efficient and useful source of hydrogen. However, materials used to form activated aluminum can be expensive. Further, given that it is subject to fouling by oxygen, water vapor, or other contaminants, activated aluminum can be challenging to handle and transport. Thus, collectively or individually, these issues can impact the cost-effectiveness and feasibility of using activated aluminum as a source of hydrogen for certain applications.

SUMMARY

According to one aspect, a system for containerized processing of activated aluminum may include a thermal reactor defining a chamber, a support disposed outside of the chamber, a shaft having a first portion and a second portion defining a longitudinal axis, the first portion disposed on the support and the second portion disposed in the chamber, and the shaft rotatable about the longitudinal axis, a fixture supported on the second portion of the shaft in the chamber, and a restraint releasably securable to the second portion of the shaft with the restraint and the fixture spaced relative to one another to hold a plurality of kits of material therebetween as the shaft rotates the fixture, the restraint, and the plurality of kits of material about the longitudinal axis in the chamber.

According to another aspect, a kit of material processable to form containerized activated aluminum may include a plurality of chips including a cold-worked aluminum alloy that is plastically deformed and non-recrystallized, at least one activating material, a pod containing the at least one activating material, and a container defining a volume fluidically sealed, by an openable cover, from an outside environment, the pod separating the at least one activating material from the plurality of chips within the volume and, via energy directed to the plurality of chips, the at least one activating material releasable from the pod onto the plurality of chips to form the cold-worked aluminum alloy into activated aluminum.

According to yet another aspect, a container for processing material to form containerized activated aluminum may include a first cover, a second cover, a first mesh, and a shell having a first end portion and a second end portion, the shell defining a volume from the first end portion to the second end portion, the first mesh supported along the first end portion of the shell, and the first cover securable to the first end portion of the shell and the second cover securable to the second end portion of the shell with the first cover, the second cover, and the shell collectively forming an air-tight enclosure of the volume with the first mesh disposed in the volume.

According to still another aspect, a method of processing material to form containerized aluminum may include, in a volume defined by a container and fluidically isolated from an environment outside of the volume, releasing at least one activating material from a pod onto a plurality of chips including a cold-worked aluminum alloy that is plastically deformed and non-recrystallized, and directing energy into the volume fluidically isolated from the environment outside of the volume, the energy mixing the at least one activating material from the pod with the cold-worked aluminum alloy of the plurality of chips.

BRIEF DESCRIPTION OF THE FIGURES

Like reference symbols in the various drawings indicate like elements.

DETAILED DESCRIPTION

Figure 1A:
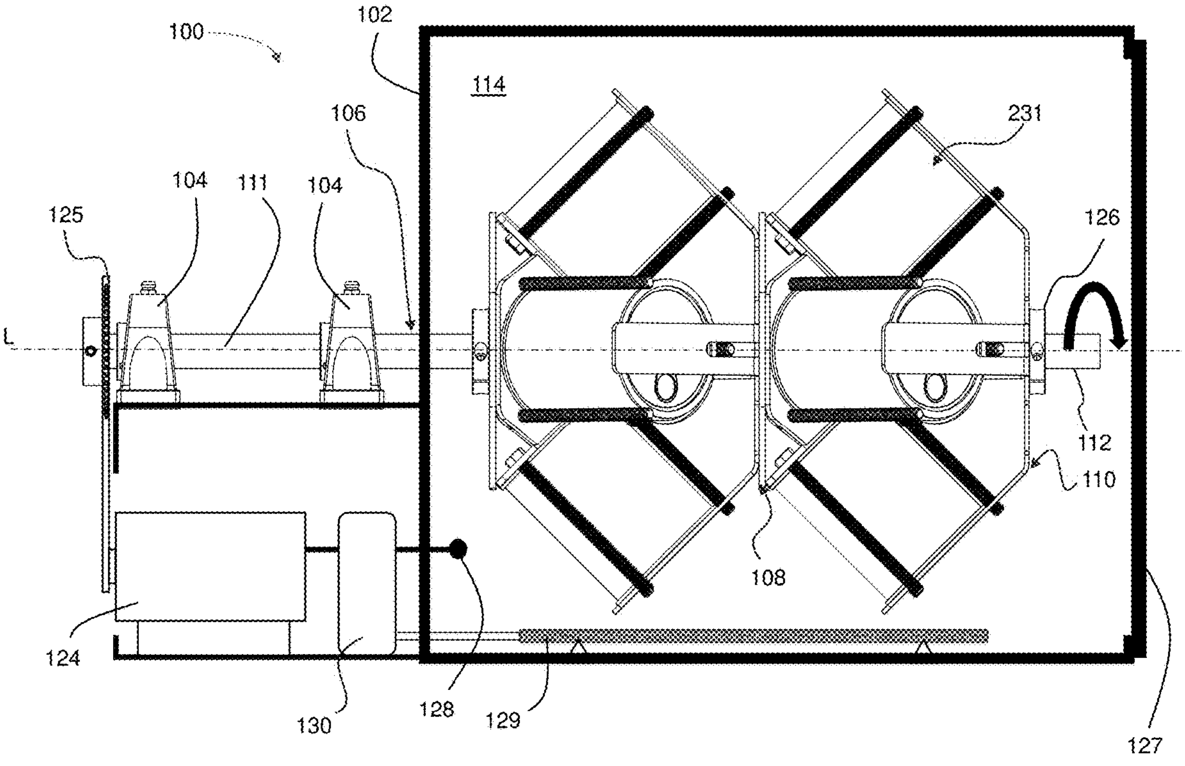
FIG. 1A is a schematic representation of a system for processing material to form containerized activated aluminum from each one of a plurality of kits of material, the system including a thermal reactor, a support, a shaft, a fixture, and a restraint.
Figure 1B:
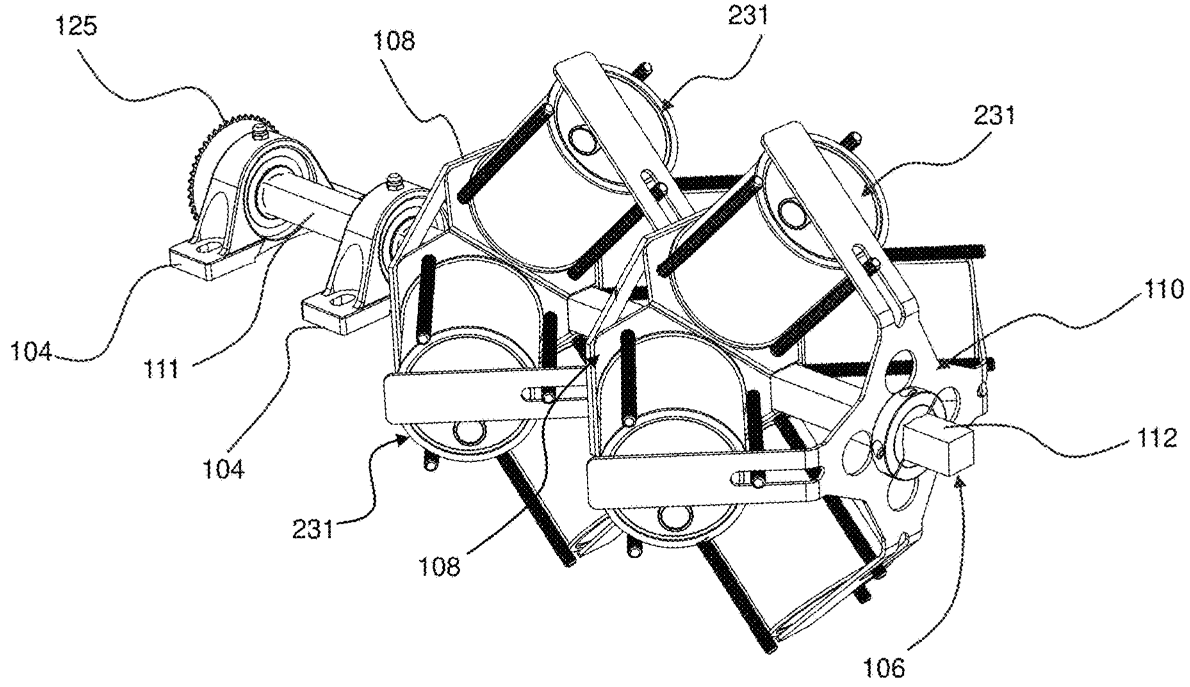
FIG. 1B is a perspective view of a sub-assembly of the system of FIG. 1A, the sub-assembly including the shaft, the fixture, and the restraint of FIG. 1A and actuatable to mechanically agitate the kits of material.
Figure 1C:
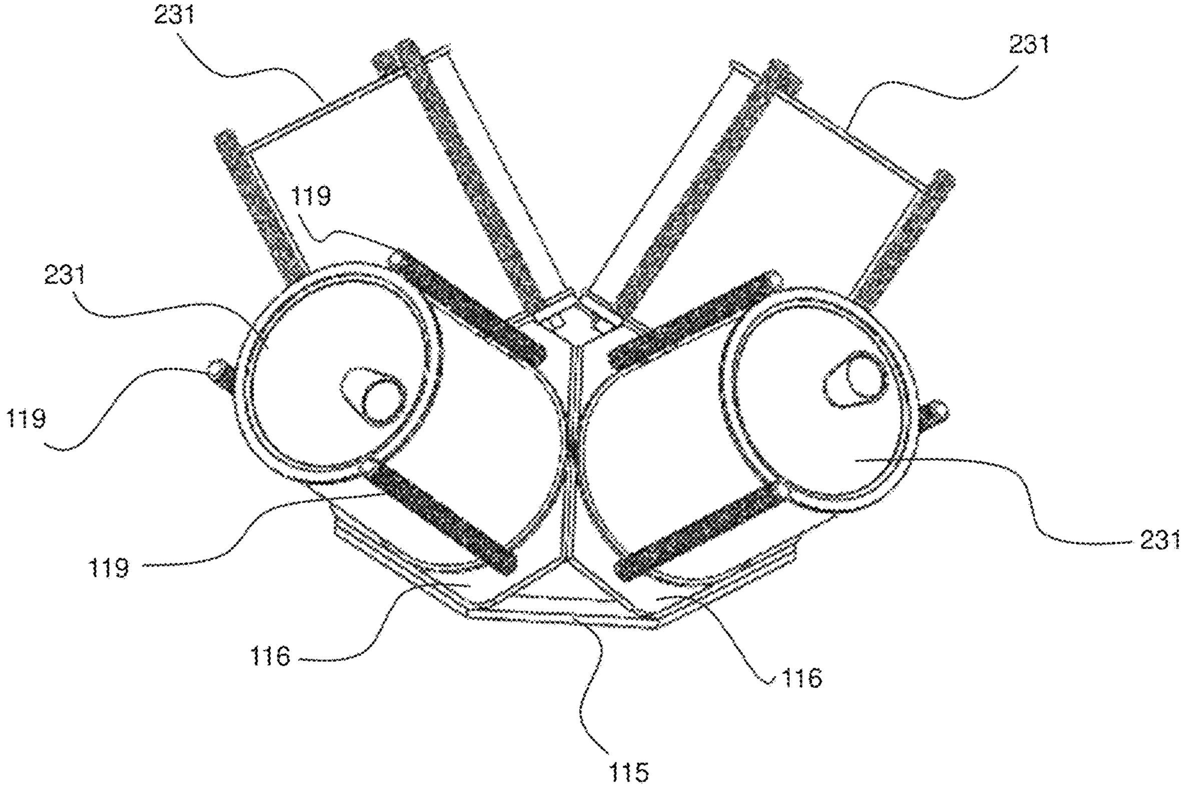
FIG. 1C is an isometric view of the fixture of FIG. 1A, with the fixture shown loaded with four kits of material processable to form containers of activated aluminum.
Figure 1D:
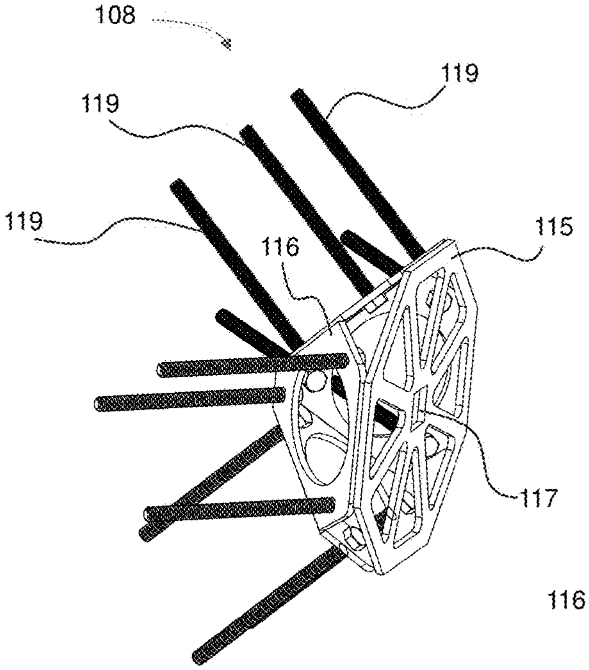
FIG. 1D is a front perspective view of the fixture of FIG. 1A.
Figure 1E:
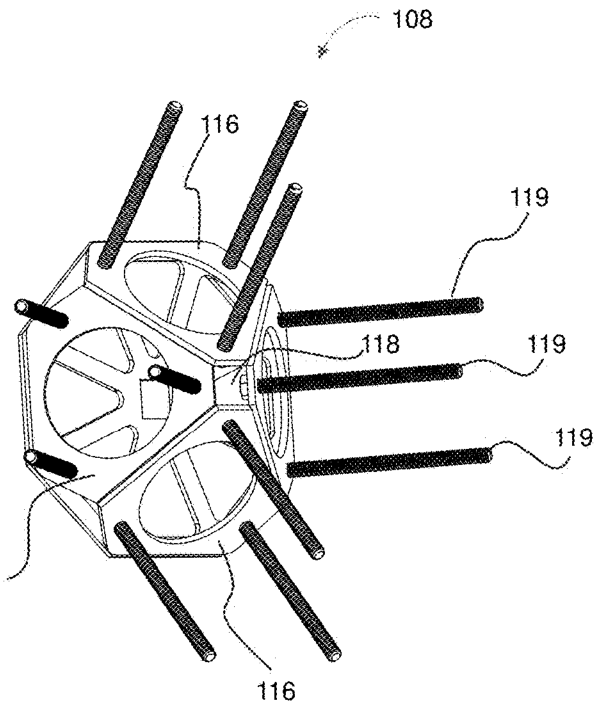
FIG. 1E is a rear perspective view of the fixture of the fixture of FIG. 1B.
Figure 1F:
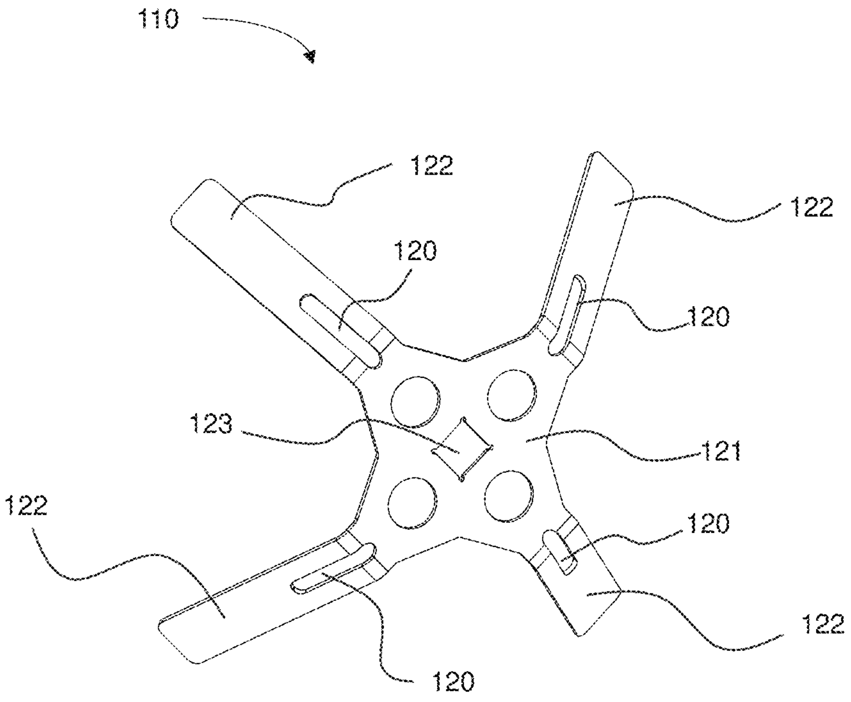
FIG. 1F is a perspective view of a restraint that is placeable over the fixture of FIG. 1A to hold kits of material in place during processing.
Figure 2A:
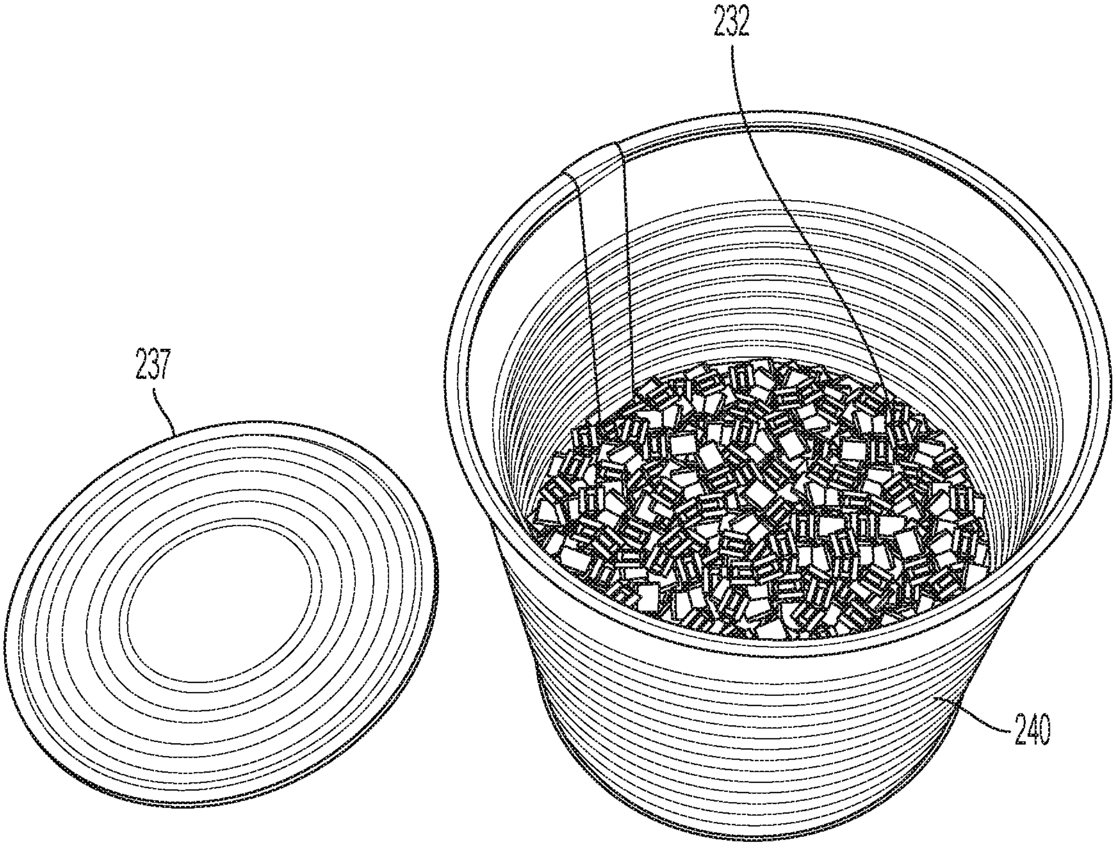
FIG. 2A is a perspective view of a kit of material, shown with a container open and partially loaded with a plurality of chips of cold-worked aluminum alloy.
Figure 2B:
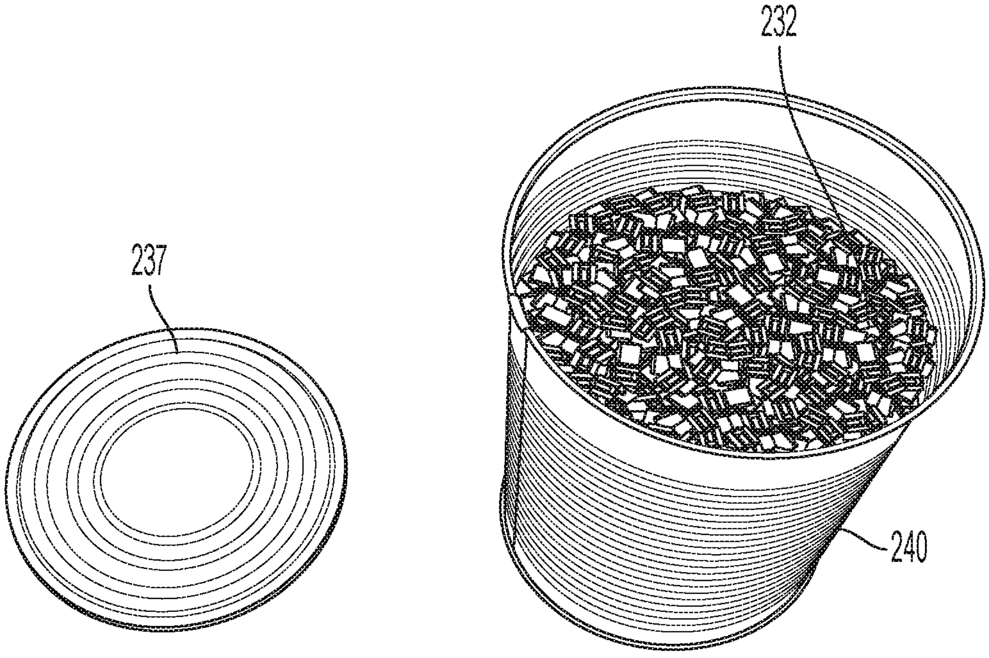
FIG. 2B is a perspective view of the kit of material of FIG. 2A, shown with the container fully loaded with the plurality of chips of cold-worked aluminum alloy.
Figure 2C:
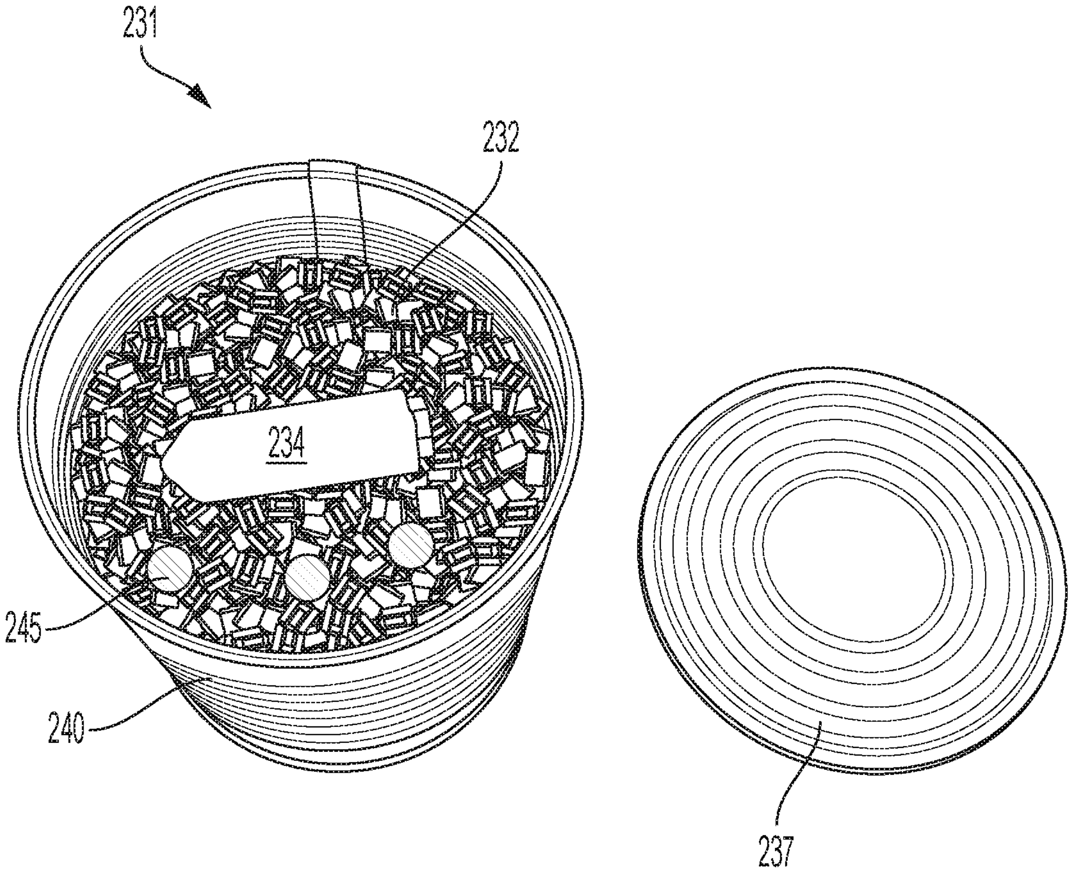
FIG. 2C is a perspective view of the kit of material of FIG. 2A, shown with a pod on the plurality of chips of cold-worked aluminum alloy, the pod including an activating material.
Figure 2D:
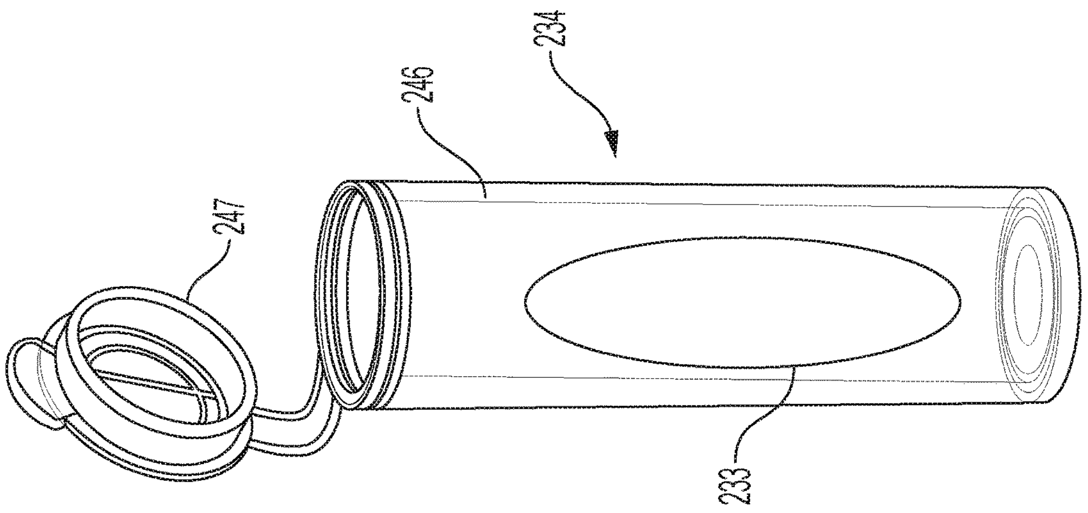
FIG. 2D is an isometric view of the pod shown in FIG. 3C, the pod including a flip-top lid for containing activation material within the pod.
Figure 3A:
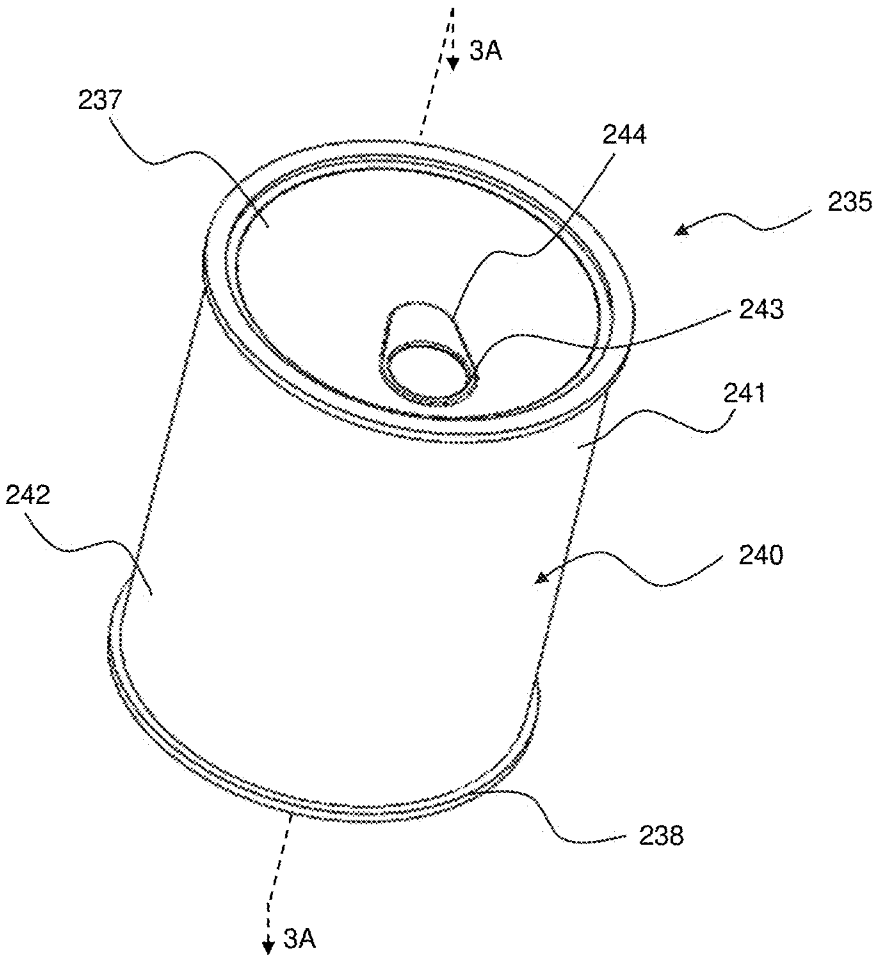
FIG. 3A is a top perspective view of a container of the kit of material of FIG. 2A-2C.
Figure 3B:
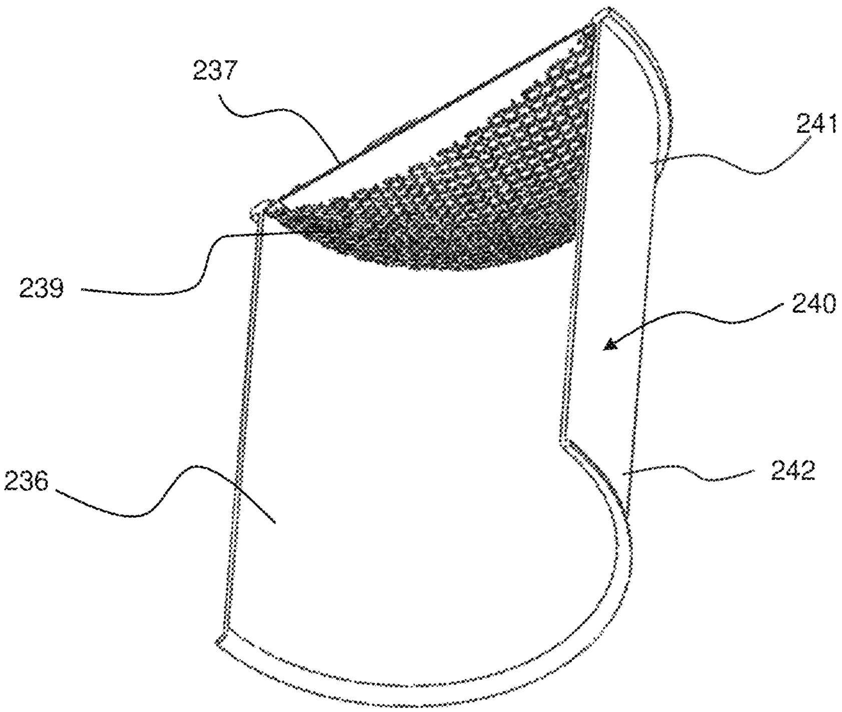
FIG. 3B is a bottom perspective view of the container of FIG. 3A, with the cross-section taken along 3A-3A in FIG. 3A and shown with a mesh in place in a volume defined by the container.
Figure 3C:
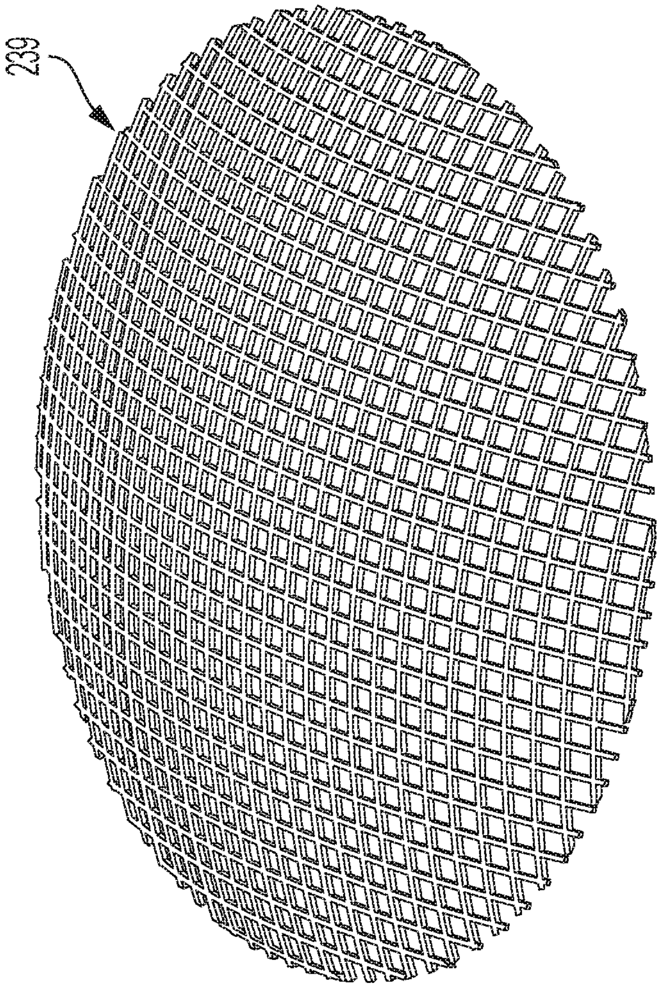
FIG. 3C is a perspective view of the mesh of the container of FIG. 3A.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or,” and the term “and” should generally be understood to mean “and/or.”

Recitation of ranges of values herein are not intended to be limiting, referring instead individually to any and all values falling within the range, unless otherwise indicated herein, and each separate value within such a range is incorporated into the specification as if it were individually recited herein. The words “about,” “approximately,” or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language (“e.g.,” “such as,” or the like) is intended merely to elaborate upon the embodiments and does not pose a limitation on the scope of those embodiments. No language in the specification should be construed as indicating any unclaimed element as essential to the practice of the disclosed embodiments.

Using activated aluminum as a source of hydrogen and heat can present challenges with respect to the cost and robustness of the supply chain used to produce the activated aluminum and deliver it with little or no spoilage to an end-use location. Accordingly, in the description that follows, various aspects of packaging materials for activated aluminum formation are described. For example, certain systems and methods described herein relate to combining aspects of manufacturing and packaging to form packaged units of activated aluminum that are cost-effective to produce (e.g., making efficient use of raw material) while being stable and robust throughout a wide range of conditions that may be encountered in a supply chain used to deliver activated aluminum to an end-use location. Additionally, or alternatively, some systems and methods described herein relate to producing kits that are activatable, for example by an end-user, to produce water-reactive aluminum on-demand in the field. Because these kits may be activated to produce water-reactive aluminum at or near a location and time at which hydrogen is needed, such kits may be well-suited for transport to remote field locations with little or no need for specialized equipment and/or training of personnel.

As used herein, the terms “activated aluminum,” and variants thereof, shall be understood to include any manner and form of aluminum that may produce hydrogen upon exposure to water, with or without the addition of additional materials. Some examples of activated aluminum useable herein are set forth in U.S. Pat. No. 10,745,789, issued to Jonathan Thurston Slocum on Aug. 18, 2020, and entitled "Activated Aluminum Fuel," the entire contents of which are hereby incorporated herein.

As used herein, the term "activating material," and variants thereof, shall be understood to include any one or more of various different materials that may chemically and/or physically treat cold-worked aluminum alloy (e.g., through thermal processing and/or mechanical agitation according to any one or more of the various techniques described herein) to make the cold-worked aluminum alloy into activated aluminum. That is, an activating material shall be understood to include any one or more of various different materials that make cold-worked aluminum alloy more reactive with water to produce hydrogen as compared to hydrogen production achievable prior to treatment with the activating material.

As used herein, the phrase "kit of material" and variants thereof shall be understood to refer to a container including a plurality of chips of cold-worked aluminum alloy and a pod containing at least one activating material, with the pod separating the at least one activating material form the plurality of chips within the container. Thus, unless otherwise specified or made clear from the context, references to a kit of material shall be understood to refer to a state of materials prior to undergoing processing (e.g., any one or more of the various different processing techniques described herein) to form activated aluminum within the container. For the sake of clarity and efficient description, a kit of material shall be understood to be distinguished from "containerized activated aluminum" in that a kit of material refers to materials in a container prior to processing to form activated aluminum in the container while containerized activated aluminum shall be understood to refer to materials in the container following processing.

For the sake of clear and efficient description, elements with numbers having the same last two digits in the disclosure that follows shall be understood to be analogous to or interchangeable with one another, unless otherwise explicitly made clear from the context, and, therefore, are not described separately from one another, except to note differences or to emphasize certain features. Thus, for example, a container 235 and a container 535 shall be understood to be analogous to or interchangeable with one another, unless otherwise specified or made clear from the context.

Referring now to FIGS. 1A-1F, 2A-2D, and 3A-3C, a system 100 for processing for containerized processing of activated aluminum may include a thermal reactor 102, a support 104, a shaft 106, a fixture 108, and a restraint 110. The shaft 106 may have a first portion 111 and a second portion 112 defining a longitudinal axis L, with the first portion 111 of the shaft 106 disposed on the support 104 outside of a chamber 114 defined by the thermal reactor 102 while the second portion 112 of the shaft 106 is disposed in the chamber 114. The fixture 108 may be supported on the second portion 112 of the shaft 106 in the chamber 114. Further, or instead, the restraint 110 may be releasably securable to the second portion 112 of the shaft 106 with the restraint 110 and the fixture 108 spaced relative to one another to hold a plurality of kits of material 231 therebetween as the shaft rotates the fixture 208, the restraint 110, and the plurality of kits of material 231 about the longitudinal axis L in the chamber 114. As described in greater detail below, the fixture 108 and the restraint 110 supporting the plurality of kits of material 231 as the plurality of kits of material 231 are mechanically agitated (e.g., rotated) and heated in the chamber 114 facilitates processing the plurality of kits of material 231 to form containerized activated aluminum using an efficient footprint of equipment. For example, in some instances, the system 100 may be implemented in a bench-top form factor or other form factor amenable to transportability, as may be useful for forming the plurality of kits of material 231 into containerized activated aluminum at or near a point of end-use of the activated aluminum to form hydrogen-containing gas.

In general, as also described in greater detail below, the plurality of kits of material 231 supported between the fixture 108 and the restraint 110 as the second portion 112 of the shaft 106 rotates in the chamber 114 of the thermal reactor 102 may receive a combination of energy that initiates introduction of at least one activation material to a cold-worked aluminum alloy and carries out processing of the cold-worked aluminum alloy to form activated aluminum. For example, mechanical agitation associated with rotation and/or energy associated with heat provided to the plurality of kits of material 231 may release at least one activating material from a stable storage state (e.g., any one or more pods described herein) onto the cold-worked aluminum alloy. Continuing with this example, further mechanical agitation and/or energy associated with heat provided to the plurality of kits of material 231 may facilitate mixing the hat least one activation material with the cold-worked aluminum alloy to form activated aluminum. Thus, as compared to treating cold-worked aluminum alloy to form activated aluminum and then filling containers with the activated aluminum, the system 100 may reduce or even eliminate material handling challenges associated with aluminum in an activated form, given that the system 100 is operable to form activated aluminum from cold-worked aluminum alloy in situ in a container. Such in situ formation of activated aluminum in a container following transport, may facilitate achieving a robust and cost-effective supply chain for providing activated aluminum to remote areas in the field.

The fixture 108, the restraint 110, and the shaft 106 may collectively form a structure symmetric about any plane that includes the longitudinal axis of the shaft. Such symmetry may be useful, for example, for reducing or eliminating unwanted vibrations associated with asymmetry of rotating components. In turn, the reduction or elimination of such vibrations may advantageously reduce various modes of degradation of the system 100 over prolonged periods of use. Further, or instead, symmetry of the structure collectively formed by the fixture 108, the restraint 110, and the shaft 106 may facilitate achieving consistent treatment of the plurality of kits of material 231—that is, with the plurality of kits of material 231 from any given treatment batch producing activated aluminum of similar quality.

Additionally, or alternatively, the fixture 108 and the restraint 110 may be spaced relative to one another to hold the plurality of kits of material 231 therebetween in an orientation in which each one of the plurality of kits of material 231 tumbles in three dimensions as the shaft 106 rotates in a single rotational direction. For example, as described in greater detail below, with each one of the plurality of kits of material 231 supported by the fixture 108 and the restraint 110 away from and at an oblique angle relative to the longitudinal axis L of the shaft 106 (similar to branches extending away from a trunk of a tree), rotation of the shaft 106 may tumble each one of the plurality of kits of material 231 in three dimensions. Such tumbling in three dimensions using only rotation of the shaft 106 is useful for facilitating uniform distribution of material within each one of the plurality of kits of material 231 to form high-quality activated aluminum while using off-the-shelf components that are cost-effective and readily sourced.

In general, the fixture 108 may accommodate the second portion 112 of the shaft 106 while also being manually loadable with the plurality of kits of material 231. While the fixture 108 may be fixed to the second portion 112 of the shaft 106 in some instances, it shall be appreciated that the fixture 108 may be removable from the second portion 112 of the shaft 106 in other instances, as may be useful for replacing components as part of routine maintenance and repair. Further, or instead, the fixture 108 may support each one of the plurality of kits of material 231 in a stable orientation as the restraint 110 is put into place along the second portion 112 of the shaft 106 to secure the plurality of kits of material 231 in place between the fixture 108 and the restraint 110. Such support of the plurality of kits of material 231 while the restraint 110 is put into place along the second portion 112 of the shaft 106 may, among other things, facilitate operation of the system 100 by a single individual. Additionally, or alternatively, while the fixture 108 is shown as supporting four instances of the kit of material 231, it shall be appreciated that the fixture 108 may support fewer instances of the kit of material 231 (e.g., as may be useful for forming the system 100 with a more compact form factor) and/or more instances of the kit of material 231 (e.g., as may be useful for increasing processing throughput of the system 100). Still further or instead, while two pairs of the fixture 108 and the restraint 110 are shown, it shall be appreciated that this is for the sake of clear and efficient description and fewer or more pairs of the fixture 108 and the restraint 110 may be used, unless otherwise specified or made clear from the context.

In certain implementations, the fixture 108 may include a base 115 and a plurality of sides 116. The base 115 and the plurality of sides 116 may be formed as separate pieces and secured (e.g., welded) together to form the fixture 108. In certain instances, the base 115 and the plurality of sides 116 of the fixture 108 may form a pyramidal-type structure that is open in the middle, as may be useful for balancing competing considerations of providing stable support to the plurality of kits of material 231 as the plurality of kits of material 231 rotate about the longitudinal axis L while also being lightweight to make efficient use of power provided to rotate the shaft 106 and efficient use of thermal energy directed into the chamber 114 of the thermal reactor 102. Further, or instead, the base 115 and each one of the plurality of sides 116 of the fixture 108 may be generously relieved of extra material to reduce weight and thermal mass and facilitate airflow around the plurality of kits of material 231 supported on the fixture 108 during operation of the system 100.

The base 115 may define a first opening 117 corresponding to the cross-sectional shape of the shaft 106 (e.g., of the second portion 112 of the shaft 106). The plurality of sides 116 may each extend away from the base 115 such that the plurality of sides 116 collectively define a second opening 118 corresponding to the cross-sectional shape of the shaft (e.g., the second portion 112 of the shaft 106). The first opening 117 and the second opening 118 may each be parallel to one another and spaced longitudinally apart from one another along the longitudinal axis L. That is, the first opening 117 may be within a first plane, and the second opening 118 may be within a second plane parallel to the first plane. Returning to the example in which the fixture 108 is welded together, in instances in which the first opening 117 and the second opening 118 are each square, a square shaft (e.g., with ½ mm flat shims placed around it) may be used to properly space and locate the plurality of sides 116 as the plurality of sides are each welded to the base 115. The plurality of sides 116 may be drilled and tapped beforehand, each to receive bolts such as those described below.

In some instances, each one of the plurality of sides 116 may define an angle oblique (e.g., an angle of 45 degrees) to a plane including the first opening 117 defined by the base 115. Such an oblique angle between the each one of the plurality of sides 116 and the base 115 may facilitate supporting each one of the plurality of kits of material 231 at an angle relative to the longitudinal axis L which. That is, each one of the plurality of kits of material 231 may be positioned to rest on a respective one of the plurality of sides 116 of the fixture 108 such that the respective angles of the plurality of sides 116 relative to the base 115, in turn, determine the respective angles of the plurality of kits of material 231 relative to the longitudinal axis L of the shaft 106 (which is the rotational axis as the shaft 106 rotates). Thus, stated differently, the respective oblique angle between each one of the plurality of sides 116 and the base 115 may facilitate consistently orienting the plurality of kits of material 231 at oblique angles relative to the longitudinal axis L such that each one of the plurality of kits of material 231 tumbles in three dimensions as the shaft 106 rotates in the chamber 114 of the thermal reactor 102.

In certain implementations, the fixture 108 may include at least three bars 119 secured to each one of the plurality of sides 116 and extending in a direction away from the respective one of the plurality of sides 116. A respective one of the plurality of kits of material 231 may be constrained between the at least three bars 119, such as may be useful while the restraint 110 is being put into place relative to the fixture 108 to secure the plurality of kits of material between the fixture 108 and the restraint 110. While additional bars may be used, it shall appreciate that the at least three bars 119 may facilitate constraining movement of the plurality of kits of material 231 while having a low thermal mass compared to the use of additional bars and/or other types of structures that may be used to constrain movement.

In some instances, one or more of the at least three bars 119 may be engageable (e.g., releasably engageable) with the restraint 110 to facilitate securing the plurality of kits of material 231 between the fixture 108 and the restraint 110. For example, the restraint 110 may define a slot 120 and one or more of the at least three bars 119 of the fixture 108 may extend through the slot 120 of the restraint 110 when the plurality of kits of material 231 are supported about the longitudinal axis L and between the fixture 108 and the restraint 110. It shall be appreciated that such engagement one or more of the at least three bars 119 may reduce the likelihood of relative movement of the fixture 108 and the restraint 110 relative to one another as the shaft 106 rotates about the longitudinal axis L. This, in turn, may reduce the likelihood of unintended movement of the plurality of kits of material 231 as the shaft 106 rotates about the longitudinal axis L. Stated differently, engagement of one or more of the at least three bars 119 with the restraint 110 may facilitate rotating the shaft 106 at faster rotational speeds that may be useful for achieving faster and/or higher quality processing of the plurality of kits of material into containerized activated aluminum.

In some implementations, each one of the at least three bars 119 may be a bolt threaded through the base 115 of the fixture 108. Threads of fully threaded bolts (e.g., McMaster may provide grip to facilitate holding the plurality of kits of material 231 in place at least until the restraint 110 is positioned relative to the fixture 108 on the shaft 106. Further, or instead, as off-the-shelf parts, such bolts may be cost-effectively sourced and easily replaced in the event a repair is required.

In certain implementations, the restraint 110 may include a hub 121 and a plurality of arms 122, with the arms being useful to facilitate securing the plurality of kits of material 231 in place while having less thermal mass than bulkier structures. Each one of the plurality of arms 122 may extend in a direction away from the hub 121 such that each one of the plurality of arms 122 may be positioned into contact with a respective one of the plurality of kits of material 231 to restrict movement of the plurality of kits of material 231 secured between the fixture 108 and the restraint 110. The hub 121 may define a third opening 123 corresponding to the cross-sectional shape of the shaft 106. With the restraint 110 secured to the second portion 112 of the shaft 106, the third opening 123 may be in a plane parallel to planes containing the first opening 117 and the second opening 118 of the fixture 108. In certain implementations, the third opening 123 may be slidable along the shaft 106 as the restraint 110 is moved into place to secure the plurality of kits of material 231 between the restraint 110 and the fixture 108 and/or to remove the restraint 110 from the shaft 106 following processing of the plurality of kits of material 231 into containerized activated aluminum.

In some instances, each one of the arms 122 of the restraint 110 may define an instance of the slot 120, even if only one of the arms 122 is securable in the slot 120. That is, each one of the arms 122 may be the same such that the restraint 110 is symmetric, which is useful for reducing vibrations. Further, or instead, with each one of the arms 122 being the same, the restraint 110 may be positioned on the shaft 106 in any one or more of various different orientations, as may be useful for rapid loading and unloading of the plurality of kits of material 231. Additionally, or alternatively, each instance of the slot 120 may be about 1-2 mm wider than the nominal diameter of each of the at least three bars 119. Continuing with this example, with normal manufacturing tolerances and the compliance of the at least three bars 119, each instance of the at least three bars 119 that extends through an instance of the slot 120 may rub the restraint 110 along the slot 120, holding the restraint 110 in place until all of the rotating components are secured to the shaft 106.

In general, the shaft 106 may extend through the thermal reactor 102 such that the first portion 111 of the shaft 106 is disposed on the support 104 outside of the thermal reactor 102 while the second portion 112 of the shaft 106 is in the chamber 114 (e.g., with the second portion 112 of the shaft 106 cantilevered relative to the first portion 111 of the shaft 106 disposed on the support 104). Such positioning of the shaft 106 relative to the thermal reactor 102 may be useful for reducing premature degradation of equipment that may be susceptible to wear and/or other types of degradation under prolonged exposure to elevated and/or cold temperatures while facilitating efficient transfer of power to rotate the shaft 106—and, thus, the fixture 108, the restraint 110, and the plurality of kits of material 231—at elevated and/or cold temperatures within the chamber 114 of the thermal reactor 102 as part of any one or more of the various different processing regimens described herein.

As an example, the system 100 may include a motor 124 mechanically coupled to a drive sprocket 125 of the first portion 111 of the shaft 106 outside of the chamber 114 of the thermal reactor 102. Continuing with this example, the motor 124 may be actuatable to deliver rotational power to the shaft 106, via the drive sprocket 125, outside of the chamber 114 of the thermal reactor 102. As may be appreciated from this example, the motor 124, mechanical coupling, and the drive sprocket 125 may each operate under less extreme operating temperatures (e.g., at normal indoor and/or outdoor ambient temperatures) than those in the chamber 114 of the thermal reactor 102 during regimens (e.g., any one or more of the various different regimens described herein) used to process the plurality of kits of material 231 into containerized aluminum. This, in turn, may facilitate more reliable operation of the system 100 over longer periods of time as compared to operating a motor and associated power transfer components in an excessively hot and/or excessively cold environment that may be used to process the plurality of kits of material 231 into containerized aluminum. In certain implementations, the motor 124 may be a fixed speed motor, which may be cost-effectively sourced as an off-the-shelf component. Further, or instead, the motor 124 may be DC motor. Additionally, or alternatively, the motor 124 may be an AC motor with variable frequency drive. While the motor 124 may directly drive the shaft 106 via the drive sprocket 125 in some instances, an indirect mechanical coupling (e.g., via a chain and/or belt) between the motor 124 and the drive sprocket 125 may facilitate a simple coupling and transmission reduction, as may be useful for low-cost and volumetrically efficiency implementation of the system 100.

The shaft 106 may generally have any one or more of various different cross-sectional shapes useful for efficient transmission of rotational motion from the shaft 106 (under power from the motor 124) to the fixture 108, the restraint 110, and the plurality of kits of material 231 secured therebetween. Thus, in some implementations, the shaft 106 may have a cross-sectional shape having at least one flat surface, with the flat surface facilitating mounting of components while also efficiently transmitting rotational motion (e.g., reducing the likelihood of slipping between the second portion 112 of the shaft 106 relative to the fixture 108 and the restraint 110 mounted thereon). For example, the shaft 106 may have a square cross-sectional shape (e.g., a 1-inch square steel shaft that is 30 inches long) or a hexagonal cross-sectional shape. As another example, the shaft 106 may be round and be at least partially keyed.

In certain implementations, the system 100 may include at least one collar 126 releasably securable to the second portion 112 of the shaft 106 to restrict axial movement of the restraint 110 and/or the fixture 108 along the longitudinal axis L as the shaft 106 rotates. As an example, in instances in which the shaft 106 has a square cross-sectional area, the at least one collar 126 may be a square shaft collar and may be secured to the shaft 106 using a cap screw that may be tightened using an Allen wrench. Additionally, or alternatively, the at least one collar 126 may be a quick cam lock lever collar.

In general, the support 104 may include rotary motion bearings such that the support 104 may restrain longitudinal and radial movement of the shaft 106 while permitting low-friction, rotational movement of the shaft 106 in response to power provided to the first portion 111 of the shaft 106 by the motor 124. Additionally, or alternatively, the rotary motion bearings may resist longitudinal and radial movement of the shaft 106 such that the second portion 112 of the shaft 106 may be cantilevered relative to the support 104, as may be useful for positioning the support 104 outside of the chamber 114 of the thermal reactor 102. As an example, the support 104 may include pillow block bearings supporting the first portion 111 of the shaft 106. As a specific example, the support 104 may include one-inch square disc harrow pillow blocks. Additionally, or alternatively, in instances in which the system 100 includes a plurality of instances of the fixture 108 the instance of the fixture 108 closest to the pillow block bearing may push against a shaft collar.

In general, the chamber 114 of the thermal reactor 102 is a substantially enclosed environment, allowing for one or more small gaps associated with passage of components (e.g., the shaft 106) from an outside environment and into the chamber 114. Further, the chamber 114 may be a temperature-controlled environment such that the plurality of kits of material 231 may be treated according to any one or more of various different heating and/or cooling phases, as may be useful for forming the plurality of kits of material 231 into containerized aluminum. Still further, or instead, the chamber 114 of the thermal reactor 102 may include a door 127 through which the second portion 112 of the shaft 106 may be accessed in the chamber 114. For example, personnel may open the door 127 of the thermal reactor 102 to load the fixture 108, the restraint 110, and the plurality of kits of material 231 onto the second portion 112 of the shaft 106 and/or to unload containerized activated aluminum from the second portion 112 of the shaft 106 according to any one or more of the various different techniques described herein. In certain instances, aluminum framing material may support the support 104, the motor 124, and the thermal reactor 102, as may be useful for forming the system 100 as an assembly that may be transported with little or no assembly required at the site of end-use of the system 100.

In some implementations, the thermal reactor 102 may be bench-top sized such that the thermal reactor 102 may process several containers at once (e.g., processing up to 100 kg of activated aluminum a day, or 1550MJ of hydrogen energy), thus facilitating setting up a small-scale operation at or near the point of use of the activated aluminum. This may, for example, facilitate safely and commercially shipping ingredients to or near the end-use site and preparing the containerized activated aluminum locally, such as may be useful for complying with transportation regulations.

As an example, the thermal reactor 102 may include a temperature sensor 128, a heater 129, and a controller 130 in electrical communication with one another. The temperature sensor 128 may be arranged (e.g., positioned inside of the chamber 114) to sense a signal indicative of temperature in the chamber 114. For example, the temperature sensor 128 may be a bulb thermometer and/or an infrared temperature sensor. The controller 130 may include a processor and a non-transitory computer-readable storage medium having stored thereon instructions that, when executed by the processor, cause the controller 130 to receive, from the temperature sensor 128, the signal indicative of temperature in the chamber 114 of the thermal reactor 102 and to actuate the heater 129 based on comparison of the signal indicative of temperature in the chamber 114 of the thermal reactor to a predetermined target temperature. As an example, the temperature in the chamber 114 may be controlled according to a predetermined temperature cycle as the shaft 106 is rotated to rotate the plurality of kits of material 231 in the chamber 114 to increase the likelihood of evenly exposing cold-worked aluminum alloy pieces to at least one activation material to form the plurality of kits of material 231 into containerized activated aluminum. Additionally, or alternatively, at a target temperature, the at least one activation material may penetrate an aluminum oxide layer on the cold-worked aluminum pieces and diffuse along grain boundaries and internal dislocations of the cold-worked aluminum pieces to form activated aluminum.

While the system 100 has been described as processing the plurality of kits of material 231 inside of the chamber 114 of the thermal reactor 102, it shall be appreciated that the system 100 may additionally or alternatively carry out other types of processing of the plurality of kits of material 231. For example, while the shaft 106 has been described as being cantilevered in the chamber 114 of the thermal reactor 102 another portion of the shaft 106 may be cantilevered outside of the chamber 114 of the thermal reactor 102 and, in such instances, the fixture 108 and the restraint 110 may be used to support the plurality of kits of material 231 on the portion of the shaft 106 cantilevered outside of the chamber 114 to facilitate tumbling the kits of material 231 without application of elevated temperature, as may be useful for further processing the kits of material 231 following a heat cycle. Further, or instead, the second cantilevered portion of the shaft 106 may be disposed in a second instance of a thermal reactor 102 such that both ends of the shaft 106 may be used to process kits of material at the same time—such as may be useful for increasing (e.g., doubling) throughput of the system 100.

Having described various aspects of the system 100, attention is now directed to various aspects of the plurality of kits of material 231 that are processable by the system 100 to form containerized activated aluminum according to any one or more of the various different techniques described herein.

Referring now to FIGS. 2A-2D and FIGS. 3A-3C, each instance of the plurality of kits of material 231 (hereinafter referred to as "the kit of material 231) may include a plurality of chips 232, at least one activating material 233, a pod 234, and a container 235. The plurality of chips 232 may include a cold-worked aluminum alloy that is plastically deformed and non-recrystallized. The pod 234 may contain the at least one activating material 233 that may be used to treat the cold-worked aluminum alloy of the plurality of chips 232 to form the plurality of chips 232 into activated aluminum reactive with water to produce hydrogen-containing gas. As described in greater detail below, the container 235 may define a volume 236 fluidically sealed from an outside environment by a first cover 237 that is openable for end use of activated aluminum formable in situ in the container 235 according to any one or more of the various different techniques described herein. As also described in greater detail below, the pod 234 may separate the at least one activating material 233 from the plurality of chips 232 within the volume 236, as may be useful for stably storing and transporting the kit of material 231 with little or no risk of unintentionally producing hydrogen in the event that the contents in the volume 236 of the container 235 of the kit of material 231 is inadvertently exposed to water. For example, if the container 235 were to rupture and the contents of the container 235 were to become exposed to water, the plurality of chips 232 of cold-worked aluminum alloy inside of the container 235 would remain substantially unreactive since the plurality of chips 232 have not been exposed to the at least one activating material 233 under activation conditions. As still further described in greater detail below, via energy (e.g., agitation and/or heat) directed to the plurality of chips 232, the at least one activating material 233 may be releasable from the pod 234 and onto the plurality of chips 232 to form the cold-worked aluminum alloy into activated aluminum within the volume 236 of the container 235. As compared to other techniques, the introduction of the at least one activating material 233 onto the plurality of chips 232 and mixing of these materials in situ within the volume 236 of the container 235 while the volume 236 is sealed from the outside environment, reduces or even eliminates material handling challenges associated with forming activated aluminum and then packaging the material.

In general, the container 235 may include the first cover 237, a second cover 238, a mesh 239, and a shell 240. The shell 240 may have a first end portion 241 and a second end portion 242, with the shell 240 defining the volume 236 from the first end portion 241 to the second end portion 242. The mesh 239 may be supported along the first end portion 241 of the shell 240, and the first cover 237 may be securable to the first end portion 241 of the shell 240 to cover the mesh 239 such that the mesh 239 is between the first cover 237 and the plurality of chips 232 in the volume 236. Additionally, or alternatively, the mesh 239 may be between the first cover 237 and the pod 234 disposed in the volume 236. The second cover 238 may be securable to the second end portion 242 of the shell 240 (e.g., after the plurality of chips 232 and/or the pod 234 containing the at least one activating material 233 are placed into the volume 236 of the container 235). The first cover 237, the second cover 238, and the shell 240 collectively form an air-tight enclosure of the volume 236 with the mesh 239, the plurality of chips 232, and the pod 234 containing the at least one activating material 233 disposed in the volume 236. In certain implementations, the kit of material 231 may include an inert gas in the volume 236 such that the volume 236 containing the plurality of chips 232 and the pod 234 containing the at least one activating material 233 is substantially oxygen-free, as may be useful for increasing the stable shelf life of the kit of material 231 before the kit of material 231 is processed to form containerized activated aluminum. Further, or instead, the inert gas in the volume 236 may reduce spoilage of the containerized activated aluminum that is formed from processing the kit of material 231.

In general, the container 235 may be formed of any one or more of various different materials that are stable under the temperature and agitation regimens-such as any one or more of such regimens described herein-used to process the plurality of chips 232 with the at least one activating material 233. Thus, for example, at least along the volume 236 of the container 235, the container 235 may be inert or substantially inert with respect to the cold-worked aluminum alloy and the at least one activating material 233. Further, or instead, to facilitate cost-effectively producing the kit of material at large-scale, the container 235 may be formed of any one or more of various different ubiquitous materials. For example, the container 235 may be formed of steel and, in certain instances, may have the form factor of a paint can. Further, or instead, the container 235 may be at least partially formed of acrylonitrile butadiene styrene, polystyrene, and/or polycarbonate.

The first cover 237 is generally openable such that water may be introduced into activated aluminum (formed from processing the plurality of chips 232) in the volume 236 via the mesh 239 while the mesh 239 reduces the likelihood or even prevents activated aluminum from prematurely spilling out from the volume 236 and adversely impacting hydrogen production. As an example, the first cover 237 may be openable manually and/or using any one or more of various different types of ubiquitous tools (e.g., a can opener, a screwdriver, etc.), as may be useful for reacting the activated aluminum in the container 235 in the field, where access to specialized tools may be limited. As an example, the first cover 237 may be a screw-on cover. Further, or instead, the first cover 237 may include a pull tab 243 and a score line 244. Continuing with this example, the pull tab 243 may be pullable to separate at least a portion of the first cover 237 from the first end portion of the shell 240 along the score line 244 to expose the volume 236 of the container 235 via the mesh 239.

With the first cover 237 and the mesh 239 mounted to the shell 240 and the plurality of chips 232 and the pod 234 containing the at least one activated material 233 disposed in the volume 236, the second cover 238 may be secured to the second end portion 242 of the shell 240. As an example, the second cover 238 and the shell 240 may form a crimped seam providing an air-tight, water-tight, and pressure-resistant seal (e.g., a double crimp that creates forms a hermetic seal such as used for canning food for long shelf-life). As a specific example, the second end portion 242 of the shell 240 may be rolled over the second over 238 to form the crimped seam.

The mesh 239 may generally define openings that help control the reaction rate between water and activated aluminum within the volume 236 of the container 235. For example, the mesh 239 may define openings that allow water to enter the volume 236 while retaining the plurality of chips 232 (processed into activated aluminum prior to introduction of water into the volume 236) within the volume 236 to facilitate maintaining heat in the volume 236 to support high-yield production of hydrogen-containing gas from the plurality of chips 232. For example, the mesh 239 may facilitate maintaining the plurality of chips 232 within the volume 236 as the container 235 (with the first cover 237 removed) is dropped or otherwise lowered into water in a reactor. Thus, in some instances, the openings defined by the mesh may be about one-tenth to one-fourth of the average maximum dimension of the plurality of chips 232. This relative sizing has been found to balance the competing considerations of allowing water to enter the volume 236 while restricting unintended movement of the plurality of chips 232 out of the volume 236 as the plurality of chips 232 react with water in the volume 236 to produce hydrogen-containing gas. Additionally, or alternatively, the mesh 239 may have an outer diameter that is equal to or slightly larger than the inner diameter of the first end portion 241 of the shell 240, as may be useful for securing the mesh 239 in place along the first end portion 241 of the shell 240. As a specific example, in instances in which the inner diameter of the first end portion 241 of the shell is 3.9 inches, the outer diameter of the mesh 239 may be 3.9 inches to about 4.0 inches.

In certain implementations, the mesh 239 may be dome-shaped (e.g., about ⅓ to about ⅕ the diameter of the mesh 239), and the mesh 239 may be supported on the first end portion 241 of the shell 240 with a concave portion of the mesh 239 facing the first cover 237 when the first cover 237 is secured to the first end portion 241 of the shell 240. The dome-shape of the mesh 239 may facilitate maintaining the mesh 239 in place as the activated aluminum in the volume 236 reacts with water when the first cover 237 is removed. Further, or instead, as compared to mesh size in instances in which the mesh 239 is flat, the domed-shape of the mesh 239 may facilitate using finer meshes facilitate better retention of the plurality of chips 232 within the volume 236 of the container 235.

In certain implementations, the mesh 239 may be at least partially formed of a cold-worked aluminum alloy. That is, the material of the mesh 239 itself may become treated with the at least one activating material 233 contained in the pod 234 as the kit of material 231 undergoes any one or more of the various different processing techniques described herein.

Continuing with this example, as water is introduced into the volume 236 to react with activated aluminum in the volume 236, the mesh 239 may be at least partially consumed by reaction with water. More specifically, as the mesh 239 is consumed, the mesh 239 may eventually allow the entire contents within the volume 236 of the container 235 to boil out for full or nearly full consumption. At this stage, the water will have been heated enough by the reactions such that the reactants dispersing freely in the hot water will continue to full reaction.

In general, the pod 234 may be disposed in any one or more of various different positions relative to the plurality of chips 232 within the volume 236 of the container 235 to facilitate reliable release of the at least one activating material 233 from the pod 234 while facilitating distribution of the at least one activating material 233 throughout the plurality of chips 232. For example, in some instances, the pod 234 may be disposed within the plurality of chips 232 (e.g., substantially in the middle of the plurality of chips 232). As another example, the pod 234 may be attached to the mesh 239.

The pod 234 may be formed of any one or more of various different materials that may release the at least one activating material 233 reliably from the pod 234 during the course of treatment of the kit of material 231. For example, at least a portion of the pod 234 may be responsive to a change in temperature such that the pod 234 is thermally activatable to release the at least one activating material from the pod above a predetermined temperature in the volume of the container. The predetermined temperature may be greater than about 100° C. and less than the recrystallization temperature of the cold-worked aluminum alloy (e.g., 340° C. to 400° C. for most aluminum alloys). In certain implementations, thermal activation of the pod 234 to release the at least one activating material 233 within the volume 236 may include softening the pod 234 to release the at least one activating material from the pod at the predetermined temperature. For example, as the pod 234 softens at the predetermined temperature, mechanical agitation associated with tumbling the kit of material 231 may cause the plurality of chips 232 within the volume 236 to penetrate the pod 234 such that the at least one activating material 233 is released from the pod 234 and onto the plurality of chips 232. By way of example, the pod 234 may be at least partially formed of a polymer (e.g., wax). As a specific example, the pod 234 may be at least partially formed of wax-coated paper and, as the wax coating melts at the target temperature, the at least one activating material 233 may seep or otherwise move through the paper and onto the plurality of chips 232 within the volume 236. Further, or instead, the pod 234 may be at least partially formed of gelatin that may melt at the target temperature.

While the pod 234 may be thermally activatable to release the at least one activating material 233 onto the plurality of chips 232, it shall be appreciated that the pod 234 may be additionally or alternatively mechanically activatable to release the at least one activating material 233 onto the plurality of chips 232. For example, at least one portion of the pod 234 may be fracturable to release the at least one activating material 233 from the pod 234 in response to agitation of the plurality of chips 232 into contact with the pod 234 in the volume 236 of the container 235. As a specific example, the at least one portion of the pod 234 may be formed of glass such that the glass may break in response to agitation of the kit of material 231 causing the plurality of chips 232 to hit the glass.

As an example, the pod 234 may include a casing 246 (e.g., formed of polymer) and a cap 247. The casing 246 may be fillable with the at least one activating material 233, and the casing 246 may be plugged with the cap 247. The cap 247 may be releasable from the casing 246 by heat and/or meltable to release the at least one activating material 233 from the casing 246. For example, the cap 247 may be closed onto the casing 246 by a friction fit. In some implementations, wax may additionally or alternatively be used to secure the cap 247 to the casing 246. As an example, the casing 246 may have a 10 mL capacity capable of holding 4-7 mL of the at least one activating material 233 (e.g., a gallium-indium eutectic) that may be used to form activated aluminum that is about 3-5% activating material by weight. Continuing with this example, by having about one-third of the capacity of the casing 246 filled with air, heating the casing 246 may not only soften the casing 246 to facilitate flipping the cap 247 from the casing 246, but heating the air within the casing 246 may cause the air to expand in the casing 246 more than expansion of air inside the volume 236 of the container 235, which may help push the first cover 237 away from the casing 246.

In general, the at least one activating material 233 releasable from the pod 234 and onto the plurality of chips 232 may include any one or more of various different materials that may interact with the plurality of chips 232 under activating conditions (e.g., agitation and/or temperature cycles) to prevent and/or reduce the rate of formation of an oxidation layer on aluminum such that the aluminum may be reactive with water to produce hydrogen-containing gas at atmospheric conditions. Thus, for example, the at least one activating material 233 may include gallium, tin, and/or indium (e.g., a gallium-indium eutectic alloy or a gallium-indium-tin eutectic alloy). Further, or instead, the at least one activating material may include Portland cement, builders lime, pharmaceutical active ingredients, ceramic powders, flowers, spices, minerals, energetic material (e.g., an oxidizer, fuel, propellant, etc.) or a combination thereof.

Given that the volume 236 of the container 235 is limited, it shall be appreciated the pod 234 of the at least one activating material 233 displaces some fraction of the volume 236 that would otherwise be occupied by the plurality of chips 232—thus, displacing some hydrogen producing potential. Further, or instead, the at least one activating material 233 may contribute significantly to the overall cost of producing containerized activated aluminum from the kit of material 231. Accordingly, it is generally desirable to limit the at least one activating material 233 to an amount that may reliably form the plurality of chips 232 into activated aluminum under activating conditions while not being significantly in excess of such an amount. For example, the at least one activating material 233 may be about 1-15% by weight of the plurality of chips 232. Further, or instead, the pod 234 may contain about 10 mL of the at least one activating material 233 per kg of the plurality of chips 232.

In general, the plurality of chips 232 of the cold-worked aluminum alloy may be sourced from any one or more forms of aluminum containing material in any one or more of a variety of form factors and, thus, may include any one or more of various types of scrap material that may be inexpensively sourced. As an example, the plurality of chips 232 may include shredded aluminum cans and/or shredded aluminum foil.

In certain implementations, the kit of material 231 may additionally, or alternatively, include grinding media 245 (e.g., steel) disposed in the volume 236 of the container 235. The grinding media 245 may have a density greater than that of the cold-worked aluminum alloy of the plurality of chips 232, and the grinding media 245 may be movable relative to the plurality of chips 232 of cold-worked aluminum alloy in the volume 236 in response to agitation of the container 235. Thus, as the kit of material 231 is agitated (e.g., shaken and/or tumbled), the grinding media 245 may cause the plurality of chips 232 to fracture into even smaller pieces in situ in the volume 236 of the container 235. As compared to larger pieces of the cold-worked aluminum alloy, the smaller pieces may be activatable using less of the at least one activating material 233—thus, reducing the cost of processing the kit of material 231 into containerized aluminum. The grinding media 245 may be greater than about 1 percent and less than about 10 percent of the total mass of contents in the volume 236 of the container 235. Further, or instead, the grinding media 245 may include a plurality of balls. For example, the plurality of balls may have an average diameter greater than about 1 mm and less than about 20 mm. Further, or instead, a ratio of an average diameter of the plurality of balls to a minimum dimension of the volume 236 of the container 235 may be greater than about 1/10 and less than about 1/5.

In certain implementations, a powder including tin particles may be disposed in the volume 236 of the container and movable with the grinding media 245 and the plurality of chips 232 in the volume 236 in response to agitation of the container. Further, or instead, the powder may further include aluminum particles that may mix with the tin particles through interaction with the grinding media 245. Further, or instead, a gallium-containing additive may be in the volume 236 (e.g., through release from the pod 234) and movable with the grinding media 245 and the plurality of chips 232 of the cold-worked aluminum alloy in response to agitation of the container 235. The result is a highly reactive powder dispersed within the plurality of chips 232.

Further, or instead, given that the grinding media 245 acts within the volume 236 of the container 235 to ball mill the contents of the container 235, it shall be appreciated that the grinding media 245 may facilitate formation of powder within the volume 236 of the container 235 without challenges associated with handling powder outside of the container 235. For example, aluminum powder (understood herein to include particles less than about 10 microns in diameter) may be combined with similarly sized tin powder and the grinding media 245 in the volume 236 of the container 235, and the container 235 may be tumbled using the system 100 without application of heat. After several days of tumbling, the grinding media 245 may have ball milled the aluminum and tin together to form a galvanic powder within the sealed environment of the volume 236 of the container 235. Because the galvanic powder is maintained in the volume 236 of the container 235 in which the galvanic powder is formed, the galvanic powder may be safely handled. For example, the container 235 may be loaded into a reactor and the container 235 may be opened in the reactor to release the power and/or to let liquid into the volume 236 of the container 235, without personnel being exposed to the galvanic powder.

In certain implementations, because the kit of material 231 is sealed, the kit of material 231 may include additional or alternative materials that may activate the cold-worked aluminum alloy of the plurality of chips 232 but are challenging to handle outside of the kit of material 231. For example, corrosive gases and/or powders that embrittle aluminum such that, when this form of aluminum is combined with water, material corrosive to aluminum (e.g., sodium hydroxide) may be formed and such corrosive material may liberate hydrogen from the aluminum.

In some implementations, the container 235 itself may act as a ball-mill to facilitate forming activated aluminum from the plurality of chips 232 and activating materials such as zinc. That is, the zinc may become powderized in the container 235.

Having described various aspects of the system 100 and the kit of material 231, attention is now directed to methods of processing material to form containerized aluminum.

Figure 4:
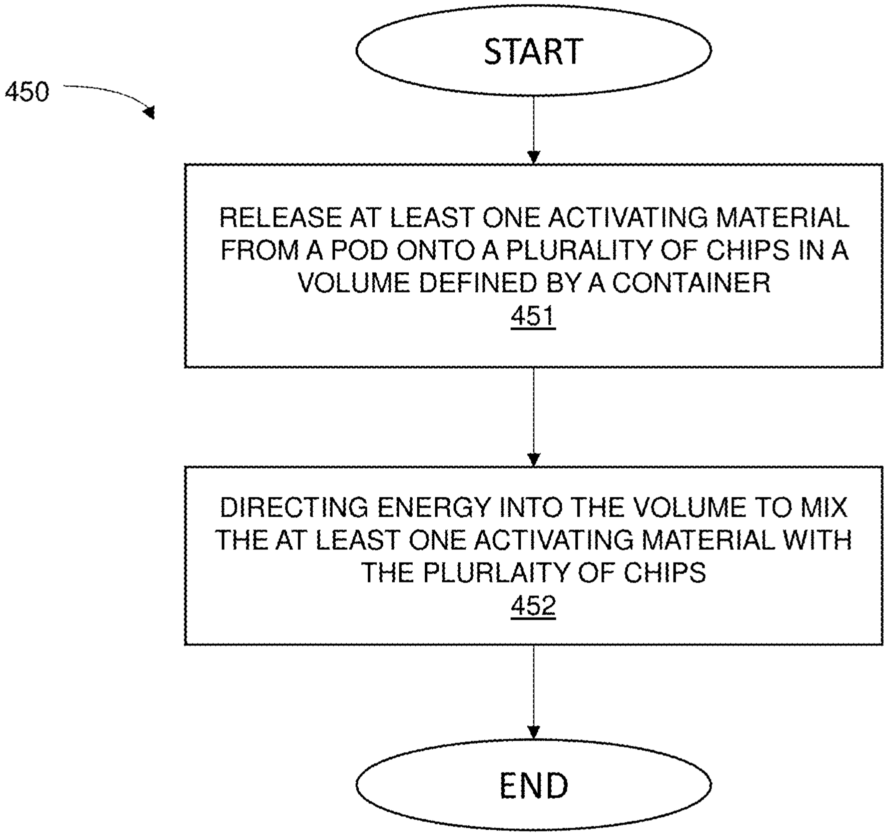
FIG. 4 is a flowchart of an exemplary method of processing material to form containerized aluminum.

FIG. 4 is a flowchart of an exemplary method 450 of processing material to form containerized aluminum. Unless otherwise specified or made clear from the context, it shall be appreciated that any one or more of the various aspects of the exemplary method 450 may be carried out using the system 100 to process the kit of material 231.

As shown in step 451, the exemplary method 450 may include, in a volume defined by a container and fluidically isolated from an environment outside of the volume, releasing the at least one activating material from a pod onto a plurality of chips including cold-worked aluminum alloy that is plastically deformed and non-recrystallized. For example, thermal energy and/or mechanical energy initially imparted to the container may release the at least one activating material from the pod.

As shown in step 452, the exemplary method 450 may include directing energy into the volume fluidically isolated from the environment outside of the volume, the energy mixing the at least one activating material from the pod with the cold-worked activated aluminum alloy of the plurality of chips. For example, directing energy into the volume may include providing heat and mechanical energy to the at least one activating material and to the cold-worked aluminum alloy of the plurality of chips. As a more specific example, the heat and mechanical energy may be contemporaneously provided to the at least one activating material and to the cold-worked aluminum alloy of the plurality of chips. In certain instances, providing mechanical energy to the at least one activating material and to the cold-worked aluminum alloy of the plurality of chips may include agitating the container. As an example, the container may be agitated for 1 to 10 hours with the volume at a temperature between 20° C. to 30° C., the temperature of the volume may then be raised to between an elevated temperature between 100° C. to 130° C., and the volume may be agitated for 1 to 3 hours at the elevated temperature. In some implementations, agitating the container may include tumbling the container in three dimensions and/or shaking the container. As a specific example, the container may include a shell, a first cover, and a second cover collectively defining the volume, and tumbling the container in three dimensions may include rotating the container about an axis of rotation oblique to a longitudinal axis defined by the shell of the container and intersecting the first cover and the second cover of the container.

In some implementations, between 1 and 8 kg of the plurality of chips in respective 1 kg containers may be preheated at 120° C. for about 30 to 120 minutes, and 2-5 wt. % Ga—In may then be added to the containers after preheating, and then the containers may be sealed. With the containers sealed, the containers may then be continuously rotated to be mixed for about 2 hours at 120° C. before the sealed containers are then taken out and allowed to cure for 2-3 days before being sufficiently reactive.

In some implementations, the exemplary method 446 of may further include preheating the plurality of chips to the melting temperature of the at least one activating material and filling 85%-90% of the volume of the container with the plurality of chips that have been preheated outside of the volume. This may balance having not so much air to expand, while still allowing the aluminum pieces in the can to pass between each other so that proper mixing may be achieved. The at least one activation material may be a eutectic in liquid form or it may be solidified into "ice cube trays" such that a frozen cube of eutectic may be dropped into the container of the plurality of chips to be treated. Continuing with this example, the container may be placed in a thermal reactor and held at 20-30° C. for 1-10 hours of rotation depending on the geometry of the plurality of chips. High surface area to volume ratio pieces (such as made from shredded sheet material or aluminum cans) will take longer to evenly coat with the at least one activation material. For flakey pieces of aluminum, grinding media—such as, a few steel balls (e.g., 3-10½' steel balls) or rocks—in the container may reduce the likelihood of clumping. This tumbling at a low temperature does not risk annealing (recrystallization) of the cold worked aluminum alloy and increases the likelihood that the eutectic may spread on all the surfaces of the plurality of chips, especially when the surface area to volume ratio of the plurality of chips is high (as is the case when aluminum beverage cans are shredded to form the plurality of chips). The temperature may then be raised to about 100 to 130° C. for about an hour to 3 hours to finalize diffusion of the eutectic into the plurality of chips along the cold worked grain boundaries. This process, however, may take more time.

While heating has been described, it shall be appreciated the cryogenic processing may additionally or alternatively be used. For example, in instances that steel containers are used, the temperature may be maintained above cold-cracking temperature of steel in the containers and proper steels such as mild low-carbon steel or austenitic stainless steel may be used to allow for use at cryogenic temperatures.

While aluminum pieces have been described as being treated, it shall be appreciated that magnesium pieces may also, or instead, be treated by similar processes.

To reduce process time and increase throughput, the plurality of chips may be formed from cut segments of aluminum electrical conductor wire that has been further cold worked by rolling.

While various aspects of containerized processing to form activated aluminum have been described, it shall be appreciated that other aspects are additionally or alternatively possible.

For example, while containers have been described as having a single end that is openable to allow water into contact with activated aluminum with the container, other implementations are additionally or alternatively possible.

Figure 5:
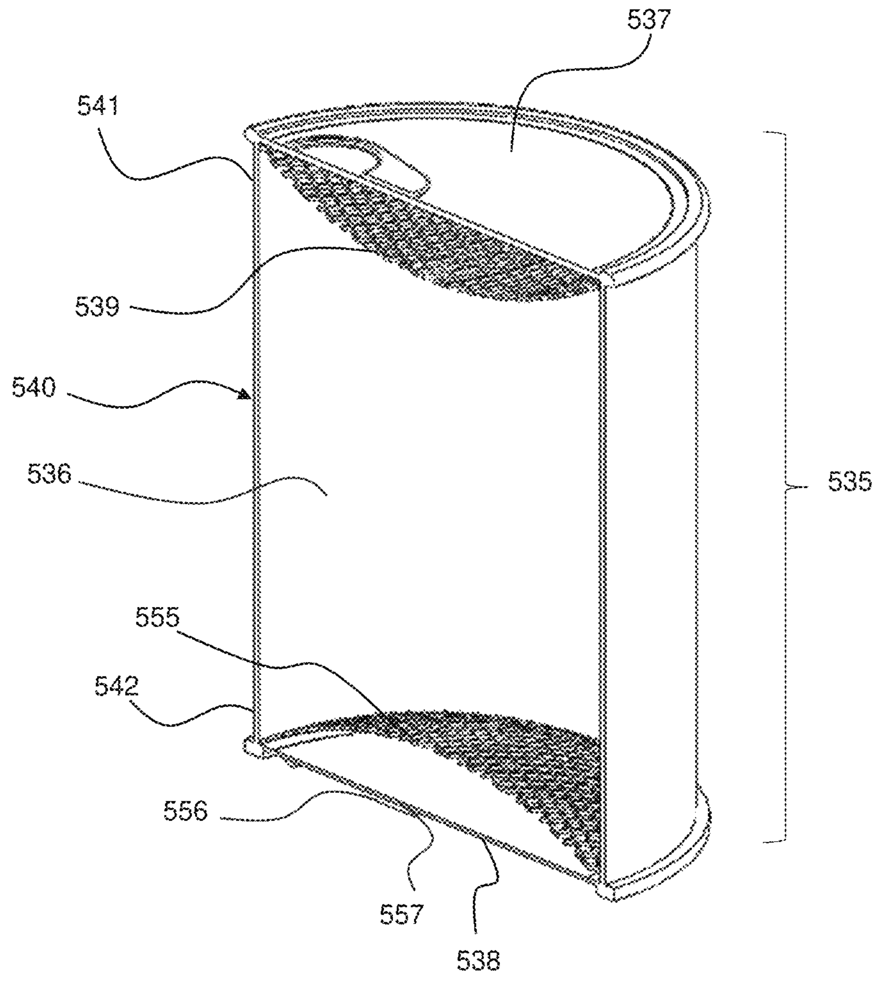
FIG. 5 is a perspective view of a cross-section of a container for processing material to form containerized activated aluminum, the container including a first mesh and a second mesh and a first cover and a second cover.

Referring now to FIG. 5, a container 535 may include a first cover 537, a second cover 538, a shell 540, a first mesh 539, and a second mesh 555. The shell 540 may have a first end portion 541 and a second end portion 542 and defines a volume 536 therebetween. The first mesh 539 may be supported along the first end portion 541 of the shell 540, and the second mesh 555 may be supported along the second end portion 542 of the shell 540. The first cover 537, the second cover 538, and the shell 540 may collectively form an air-tight enclosure of the volume 536 with the first mesh 539 and the second mesh 555 disposed in the volume 536 and defining a flow path therebetween. For example, the first cover 537 and the second cover 538 may each be releasable from the shell 540 such that water may flow into the volume 536 of the container 535 from both ends of the shell 540, as may be useful for rapidly reacting activated aluminum within the container 535 to completion.

As an example, the second cover 538 may be manually releasable from the second end portion 542 of the container 535 and/or releasable using a common tool such as a can opener. As a specific example, the second cover 538 may include a second pull tab 556 and a second score line 557. The second pull tab 556 may be pullable to separate the second cover 538 from the second end portion 542 of the shell 540 along the second score line 557 to expose the volume 536 of the shell 540 via the second mesh 555.

In certain implementations, the second mesh 555 may be dome-shaped. As an example, the second mesh 555 may be supported on the shell 540 with a concave portion of the second mesh 555 facing the second cover 538 when the second cover 538 is secured to the second end portion 542 of the shell 540. Further, or instead, the second mesh 555 may be at least partially formed of a cold-worked aluminum alloy such that the second mesh 555 may become treated and form activated aluminum that may be reacted as water is introduced into the volume 536.

Having described certain aspects of containers having a single open end and double open ends, attention is directed now to experimental results using both types of containers.

Testing was done on various instances of the containers described herein to evaluate the effect that mesh size has on reactivity of the contents of the container when the container is submerged in an excess of water. Testing was done with up to 30 parts water to 1 part fuel by mass, but was decreased in some tests to 15 parts water to 1 part fuel by mass, herein after referred to as 30:1 and 15:1, respectively, for the sake of convenience.

Experiments were run using containers filled with the aluminum chips such that the total weight of the container and the contents of the container (e.g., the plurality of chips, the activating material, and the mesh) was 1 kg 29 oz. The plurality of chips were treated with activating material inside the containers. As may be appreciated by the foregoing, an advantage of using the container to regulate reaction of the activated aluminum and water is that the plurality of chips may be treated in situ in the can to form activated aluminum, thus eliminating or reducing the need for separate manufacturing steps associated with treatment of the aluminum chips, and the mesh used as a regulator may be placed inside the container with the aluminum chips that are treated in the container. For example, the mesh may be steel, which is only marginally affected by the liquid metals used to treat the aluminum and thus is unlikely to interfere with the treatment process.

Figure 6A:
FIG. 6A is a photograph of a first arrangement of containerized activated aluminum used for experimental testing, the first arrangement including a container having a single-side opening and a mesh resting under a lip of the container along the single-side opening, with the mesh constraining itself and a plurality of chips of activated aluminum inside of the container.

Referring now to FIG. 6A, certain experiments were performed using a container with a single side open and a mesh resting under a lip of the can, constraining itself and thus the plurality of chips of cold-worked aluminum alloy inside of the container.

Figure 6B:
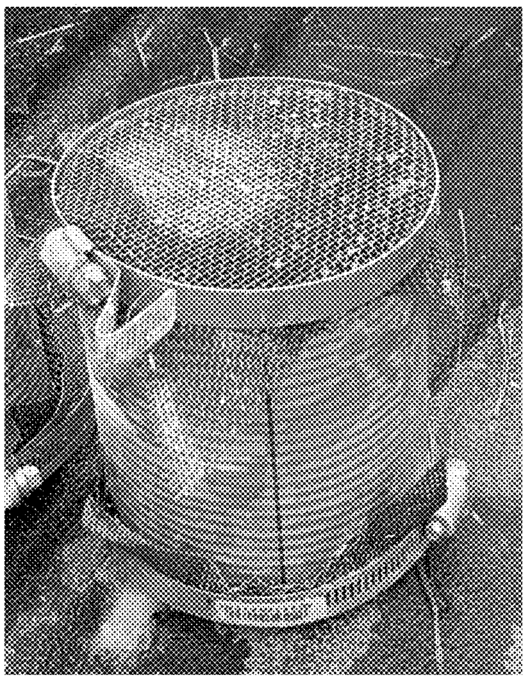
FIG. 6B is a photograph of a second arrangement of containerized activated aluminum used for experimental testing, the container open on both ends with a respective mesh at each open end constraining a plurality of chips of activated aluminum inside of the container.

Referring now to FIG. 6B, certain experiments were performed using a container that is open on both ends with mesh at each open end such that water may enter both open ends of the container.

Figure 6C:
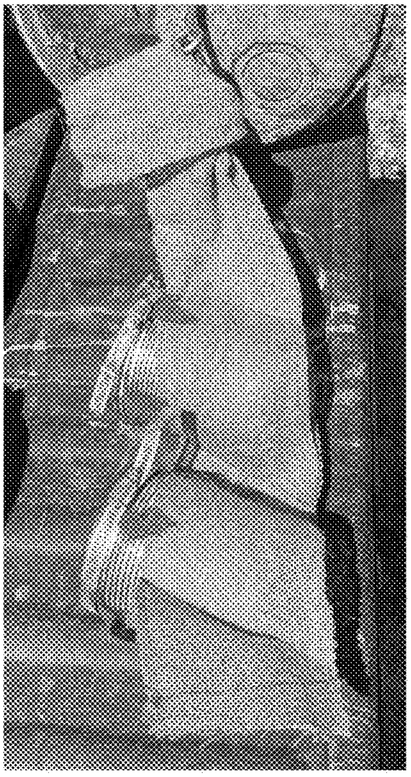
FIG. 6C is a photograph of an experimental setup of two instances of the first arrangement of containerized activated aluminum constrained in a cloth retainer holding each one of the first arrangements at a specific angle when the first arrangements are suspended in water during reaction.

Referring now to FIG. 6C, certain experiments were performed using an experimental arrangement of two containers constrained in a cloth retainer to hold each container at a specific angle when the containers are suspended in the water during reaction. For the experiments reported herein, the cloth was burlap, but it shall be appreciated that other types of material may be additionally or alternatively used. The retainer may also be laid down in a reactor if desirable. Further, or instead, given that the retainer may set the angle of reaction of the containers in water, spacing between multiple containers, and may raise and lower the containers from the water, the retainer may facilitate controlling mass-loading of activated aluminum into water in a reaction vessel to achieve controlled and efficient production of hydrogen. Further, or instead, the retainer may facilitate rapid loading of a reaction vessel with a narrow inlet orifice such as a tall and thin reaction chamber. Still further, or instead, it has been experimentally determined that, reacting the can at an angle (e.g., 30 degrees relative to the surface of water in a reaction chamber) with a 14×14 mesh results in slow reaction of fresh water with activated aluminum in the container to produce hydrogen-containing gas over a long duration. That is, with the container at an angle relative to the surface of the water, the fuel was observed to partially choke itself off, but not enough to halt the reaction as was observed at angles of 45 degrees and greater relative to the surface of the water. The angle of the container relative to the water may further, or instead, facilitate opening only a single side of the container for reaction, which may be highly advantageous for a pull-tab container due to the ready availability of such containers around the world. In some implementations, the container may be a double pull-tab can (with a pull-tab on each end of the can). While this is convenient, such a double pull-tab can may be more challenging to procure and/or manufacture as compared to a single pull-tab can.

Figure 6D:
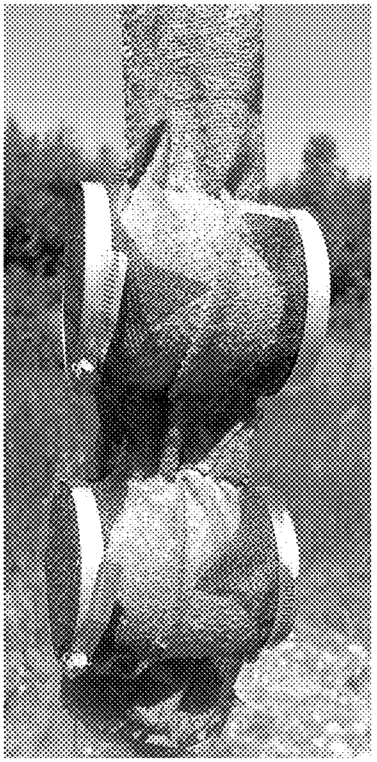
FIG. 6D is a photograph of an experimental setup of two instances of the second arrangement of containerized activated aluminum constrained in a cloth retainer at an angle of 30 degrees.

Referring now to FIG. 6D, certain experiments were performed using an experimental arrangement in which two containers were constrained in a cloth retainer at an angle of 30 degrees, with each container having an open end opposite a closed end, and each container including a respective mesh at the open end. For experiments performed using this experimental arrangement, the retainer was used to lower the containers into a drum of water at 20:1 water:fuel ratio (by mass) and the activated aluminum fuel was allowed to react with water to produce hydrogen-containing gas.

TABLE 1

Experimental results for reactions with side orientation of containers

| Container openings | Double Sided | Double Sided | Double Sided | Double Sided | Double Sided | Double Sided | Double Sided | Double Sided | Single Sided |
|---|---|---|---|---|---|---|---|---|---|
| Mesh Size | 4 × 4 | 4 × 4 | 7 × 7 | 12 × 12 | 14 × 14 | 14 × 14 + 16 × 16 | 16 × 16 | 16 × 16 | 14 × 14 |
| Fuel Mass (kg) | 1 | 1 | 1 | 1 | 1 | 1 | 1 | 1 | 1 |
| Water:fuel ratio | 30 | 30 | 30 | 30 | 30 | 30 | 30 | 30 | 30 |
| Water type | Salt water w/ tea | Fresh | Fresh | Fresh | Fresh | Fresh | Fresh | Fresh | Fresh |
| Time from start to peak reaction finish (mins) | 9 | 4.75 | 6.75 | 5.5 | 4.75 | 5.25 | 120 | 120 | 9 |
| Notes | Full reaction | Full reaction | Full reaction | Full reaction | Full reaction | Full reaction | Full reaction | Full reaction | Full reaction |

TABLE 2

Experimental results for other orientations of openings.

| Container openings | Single Sided | Single Sided | Double Sided | Single Sided | Single Sided |
|---|---|---|---|---|---|
| Reaction orientation | Opening inclined to 45 degrees | Opening inclined to 30 degrees | Sleeve Test, cans on side | Opening inclined to 30 degrees | Sleeve test, cans inclined to 30 degrees |
| Mesh Size | 14 × 14 | 14 × 14 | 14 × 14 | 16 × 16 | 14 × 14 |
| Fuel Mass (kg) | 1 | 1 | 2 | 1 | 2 |
| Water:fuel ratio | 30 | 30 | 20 | 30 | 20 |
| Water type | Fresh | Fresh | Fresh | Fresh | Fresh |
| Time from start to peak reaction finish (mins) | NA | 10 | 9 | 9 | 150 |
| Notes | Partial reaction. Water could not reach all fuel in container due to incline | Full reaction. Container came loose. | Full reaction | Full reaction | Full reaction. |

Tests performed using containers reacted horizontally with a double-sided steel mesh (4×4) exhibited a rapid and energetic peak reaction of water and activated aluminum, with the reaction ending after 4.75 minutes. However, the 4×4 mesh was too large to constrain the activated aluminum inside the can. Accordingly, hydroxide was observed to escape freely from the container during the reaction, allowing more activated aluminum in the container to react with water until the activated aluminum was consumed.

Tests performed using containers reacted horizontally with a double-sided steel mesh (7×7) resulted in a longer peak reaction, as compared to the tests carried out using the 4×4 mesh. Specifically, using the 7×7 mesh, the reaction ended at 6.75 minutes from initiation, but the mesh still was not able to constrain the activated aluminum fully in the container. Tests performed using 12×12 and 14×14 meshes (smaller mesh size, and more restrictive than 4×4 and 7×7) showed a trend toward faster peak reactions than the 7×7 mesh, and approximately as rapid as the experimental results observed using the 4×4 mesh. This indicates that there is a non-linear relationship between mesh size and reactivity of the activated aluminum fuel inside the containers. Without wishing to be bound by theory, in the experiments performed using the smaller mesh sizes, it is likely that the activated aluminum reacts in a concentrated environment with the water and thus is allowed to heat up rapidly and react rapidly as well. These smaller mesh sizes may reduce the likelihood of or even prevent the activated aluminum from dissipating into the water outside of the container, where the activated aluminum may cool, while these smaller mesh sizes may facilitate contain the hydroxide inside until the hydroxide is forced out of the container by the expanding fuel.

In similar tests performed using containers having 16×16 mesh, the reaction never truly peaked, but all of the activated aluminum was completely reacted after approximately 120 minutes. This indicates that a 16×16 mesh may facilitate achieving a long and slow reaction of activated aluminum with water to produce hydrogen-containing gas. Without wishing to be bound by theory, it is believed that the 16×16 mesh is sufficiently small enough to prevent, or at least reduce the likelihood of, rapid ejection of hydroxide from the container, while also facilitating sufficient ingress of water into the container to react with the activated aluminum to completion over a long duration in an excess of water.

Additional tests were carried out using containers having single open ends. In these tests, it was determined that the angle of the container relative to the surface of the water (hereinafter referred to as the reaction angle) of approximately 30 degrees with a 14×14 mesh achieves results to those observed for the container with the double-sided opening and the 16×16 mesh on each side. For these tests, two single-sided cans were mounted in the burlap retainer and allowed to react in 20:1 water:fuel ratio (by weight). In these tests, the activated aluminum was observed to react to completion in approximately 150 minutes, indicating a similar result to the container with double-sided openings having 16×16 mesh and laid sideways. Thus, there are combinations of mesh size and angle of the container that may facilitate achieving long, controlled, and complete reactions from canned fuel with mesh-screens installed over the open orifices of containers. Similarly, there are combinations of mesh size and angle that may facilitate achieving rapid, controlled reactions in implementations in which a large amount of hydrogen-containing gas is desirable within a short time frame. Further, or instead, with the retainer, one may mix and match mesh sizes both on cans and amongst multiple containers to facilitate achieving a release of a large quantity of hydrogen-containing gas early on in the reaction, while having a steady stream of hydrogen-containing gas generated from other cans of the activated aluminum, as desired for a given use case.

While dome-shaped meshes have been described, other types of meshes are additionally, or alternatively possible.

Figure 7:
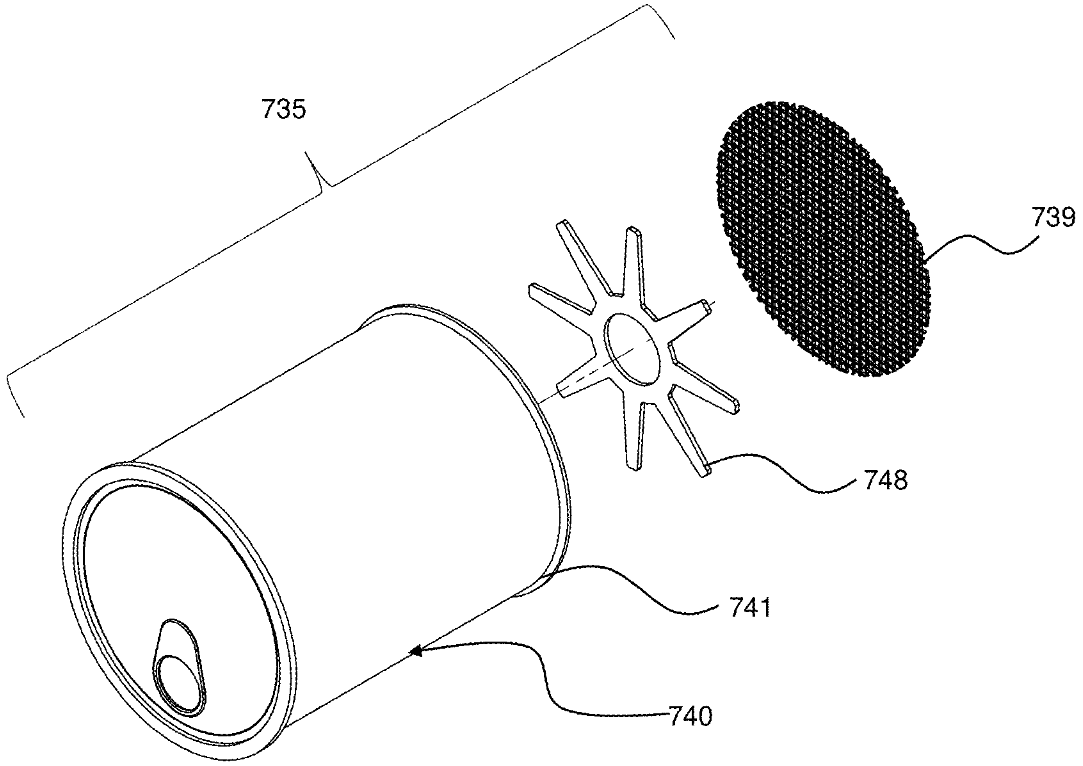
FIG. 7 is a perspective, exploded view of a container including a support and a mesh.

For example, referring now to FIG. 7, a container 735 may include a mesh 739 and a buttress 748. The buttress 748 may be coupled to a first end portion 741 of a shell 740 of the container 735 and disposed in a volume defined by the shell 740. The mesh 739 may be flat and positionable on the buttress 748 in the volume with the buttress 748 restricting movement of the mesh 739 in the volume. In certain implementations, the buttress 748 may be at least partially formed of cold-worked aluminum such that the buttress 748 may become treated to form activated aluminum and may react to form hydrogen-containing gas when exposed to water.

While kits of material have been described has including certain types of pods, other types of pods are additionally, or alternatively, possible.

Figure 8:
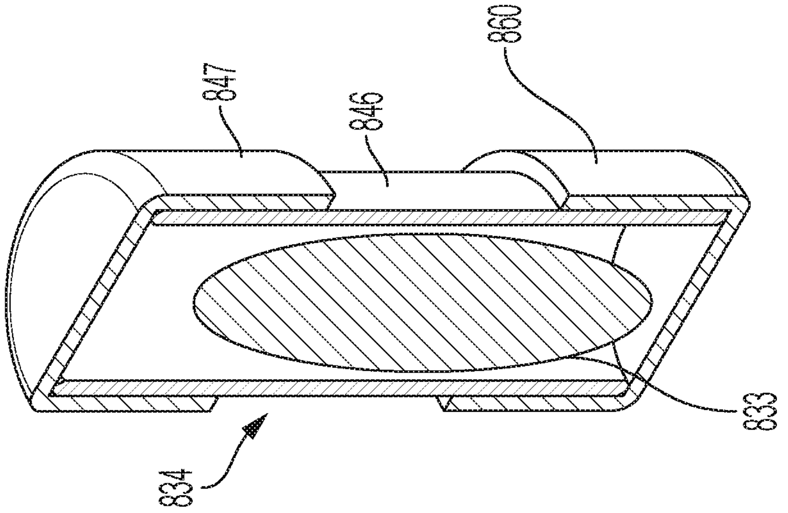
FIG. 8 is an isometric view of a cross-section of a pod including external caps for containing at least one activation material.

For example, referring now to FIG. 8, a pod 834 may include a casing 846, a first cap 847, and a second cap 860. The first cap 847 and the second cap 860 may be secured externally about the casing 846 to seal the at least one activation material 833 in the casing 846. As compared to internal caps, the first cap 847 and the second cap 860 leave more space inside of the casing 846 to accommodate the at least one activation material 833 and/or air. Heated air pressure and expanding activation material may help to release the first cap 847 and the second cap 860 and also to expand the casing 846.

Figure 9:
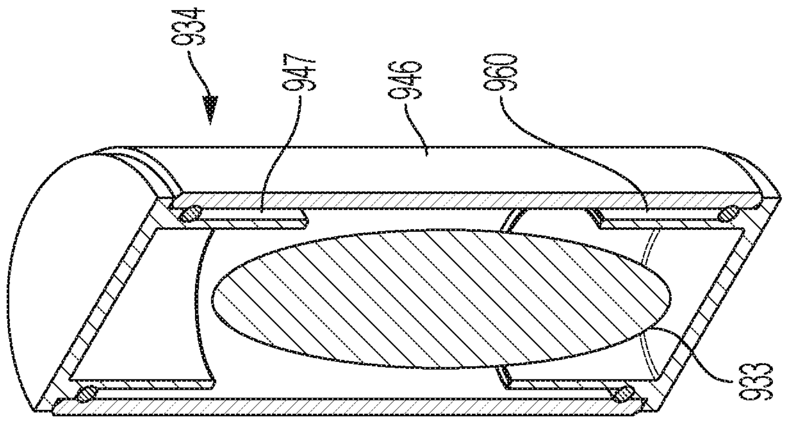
FIG. 9 is an isometric view of a cross-section of a pod with internal caps for containing at least one activation material.

As another example, referring now to FIG. 9, a pod 934 may include a casing 946, a first cap 947, and a second cap 960. The first cap 947 and the second cap 960 may be secured internally within the casing 946 to seal the at least one activation material 933 in the casing 946. As compared to external caps, the first cap 947 and the second cap 960 may facilitate release from the casing 946 as the casing 946 expands relative to the first cap 947 and the second cap 960.

In some implementations, O-rings may be stretched over caps, each O-ring may roll into position and compresses to seal and hold the cap into place. A wax ring may also or instead be used in place of the O ring. Alternatively, or in addition, a tapered cap may be pressed in place.

With regard to volume customization:

TABLE 3 first example of volume customization of a pod with a tubular casing.

| Tube | | | |
|---|---|---|---|
| OD (in) | 0.75 | | |
| ID (in) | 0.625 | | |
| Length (in) | 2 | 2.5 | 3 |
| volume | | | |
| in^3 | 0.614 | 0.767 | 0.920 |
| ml | 10.05 | 12.57 | 15.08 |

TABLE 4 second example of volume customization of a pod with a tubular casing.

| Tube | | | |
|---|---|---|---|
| OD (in) | 0.875 | | |
| ID (in) | 0.75 | | |
| Length (in) | 1.5 | 2 | 2.5 |

TABLE 4-continued second example of volume customization of a pod with a tubular casing.

| volume | | | |
|---|---|---|---|
| in^3 | 0.663 | 0.884 | 1.104 |
| ml | 10.86 | 14.48 | 18.10 |

Figure 10A:
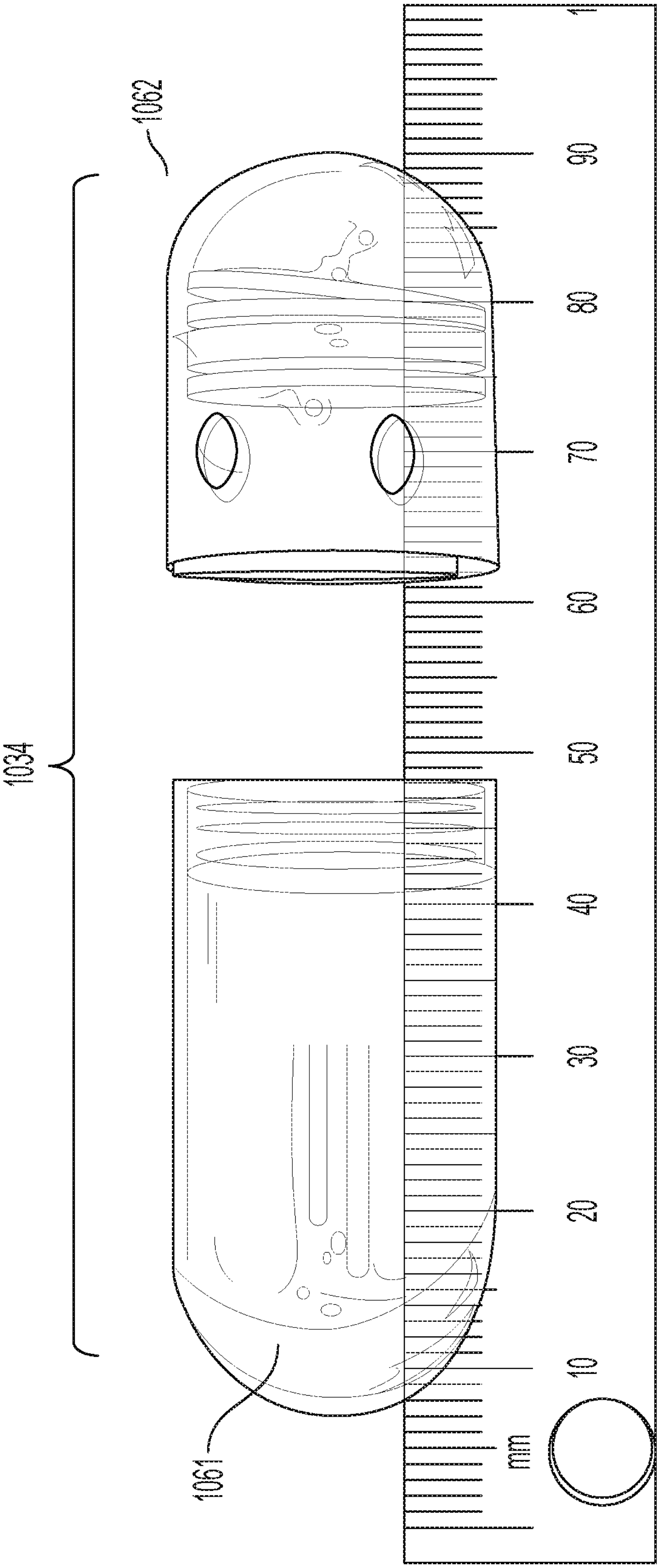
FIG. 10A is a schematic representation of a pod including snap-together portions for containing at least one activation material, the snap-together portions shown separate from one another.
Figure 10B:
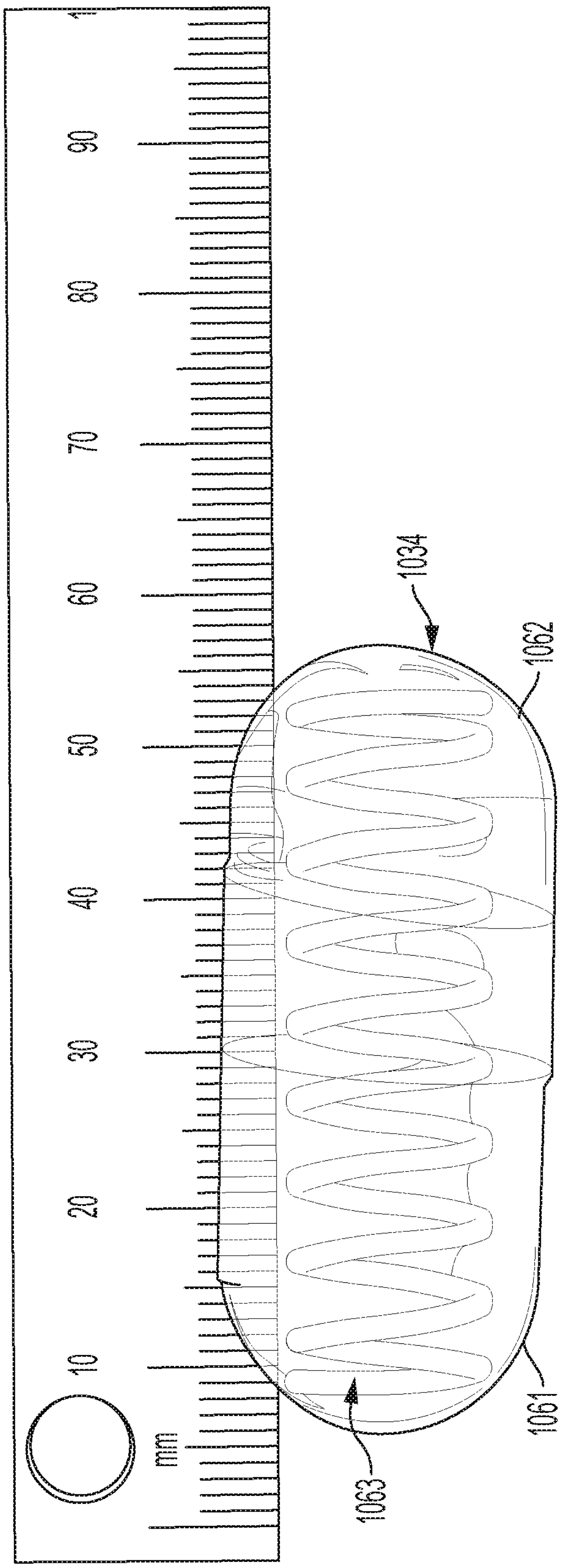
FIG. 10B is a schematic representation of the pod of FIG. 10A shown with the snap-together portions coupled to one another and a spring disposed within the pod.

As another example, referring now to FIGS. 10A and 10B, a pod 1034 may include a first section 1061 and a second section 1062 that may be snap-fit together to seal an activating material therein. The pod 1034 may be at least partially formed of a gelatin dissolvable under certain conditions, while remaining strong even at 100° C. Continued tumbling of the chips at temperature can release the eutectic. However, to increase the likelihood of releasing the eutectic from the pod 1034, the pod 1034 may include a spring 1063 to provide a preload force. For example, when the material of the first section 1061 and the second section 1062 of the pod 1034 softens by temperature, the spring 1063 may push the first section 1061 and the second section 1062 away from one another such that activating material may be released from the pod 1034. In certain implementations, the spring 1063 may be at least partially formed from a shape memory alloy (e.g., nitinol) such that, in its soft low temperature form (Martensite), the force of the spring 1063 against the first section 1061 and the second section 1062 of the pod 1034 is low. At 100° C., however, when the activating material is to be released from the pod 1034, the shape memory alloy may be in Austenite phase such that, to return to its initial shape, the spring expands to move the first section 1061 and the second section 1062 of the pod 1034 away from one another.

In some instances, the likelihood of unintentional leaking of the activating material from the pod 1034 may be decreased by the use a wax seal around the rim interface, and/or paint or a temperature sensitive (softening) adhesive may be applied onto the snap region before the first section 1061 and the second section 1062 are pressed together.

The following is an example of a capsule that may hold enough activation material to treat 1 kg of aluminum.

TABLE 5 example of a pod in the form of a capsule to hold enough activation material to treat 1 kg of aluminum.

| | | |
|---|---|---|
| Density Gallium | 5.1 | g/ml |
| Density Indium | 7.3 | g/ml |
| Density 90/10 GaIn | 5.32 | g/ml |
| % GaIn activation material | 5% | |
| Mass aluminum | 1000 | g |
| Mass GaIn | 50 | g |
| Volume GaIn | 9.4 | ml |
| 1 Ounce capsule volume | 29.6 | ml |
| % capsule filled | 32% | |

Figure 11A:
FIG. 11A is top view of a kit of material including a pod, the pod including a bag made from paper shown with a first end of the bag sealed as at least one activating material is added to the pod.
Figure 11B:
FIG. 11B is a top view of the kit of material of FIG. 11A, shown with each end of the bag sealed with the at least one activating material contained therein.

As another example, referring now to FIGS. 11A-11B, a pod 1134 may include a single folded closed end 1164 and an open end 1165. The pod 1134 may be formed of craft paper, paper towel, wax paper, or similar materials, provided the material itself is impermeable to the activating material at room temperature. A gallium-indium eutectic has very high surface tension at room temperatures and does not wet paper similarly to water. Therefore, the gallium-indium eutectic may be easily containable and storable using paper products until treatment of the plurality of chips using the gallium-indium eutectic is needed. The open end 1165 of the pod 1134 may be folded closed in any orientation relative to the closed end 1164.

Figure 12A:
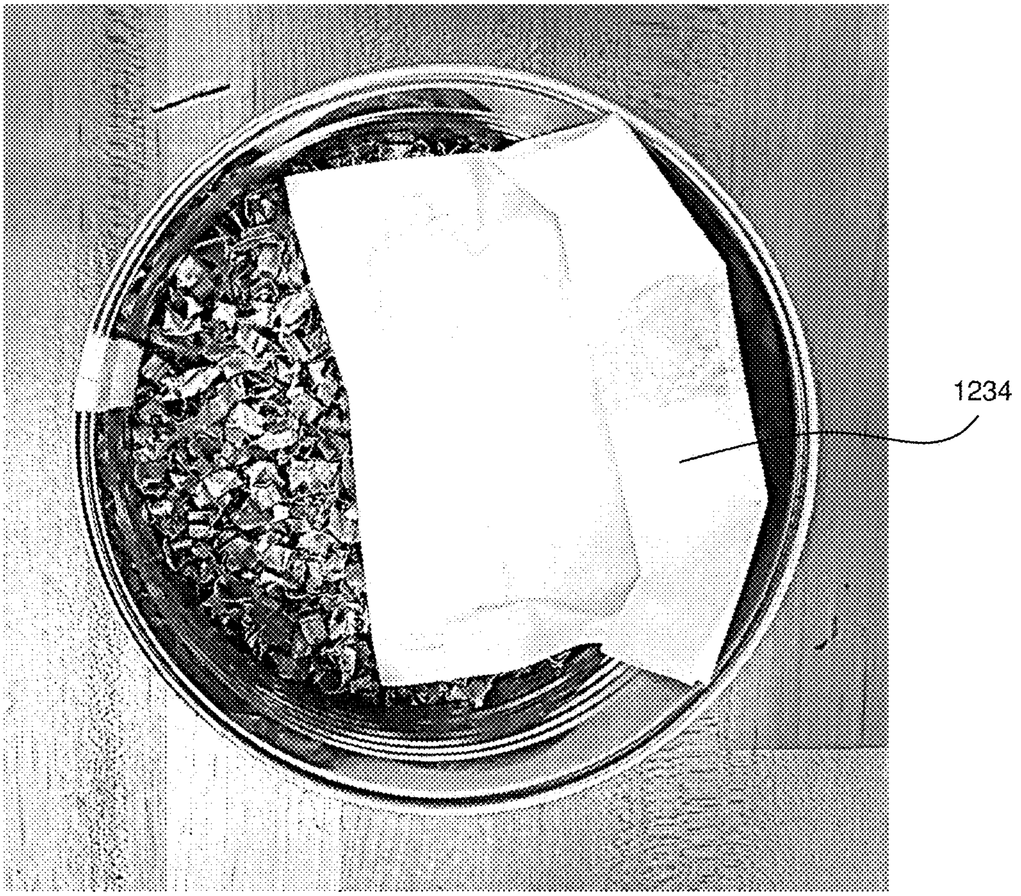
FIG. 12A is a top view of a kit of material including a pod, the pod including a bag made from glassine paper with a first end sealed as at least one activating material is added to the pod.
Figure 12B:
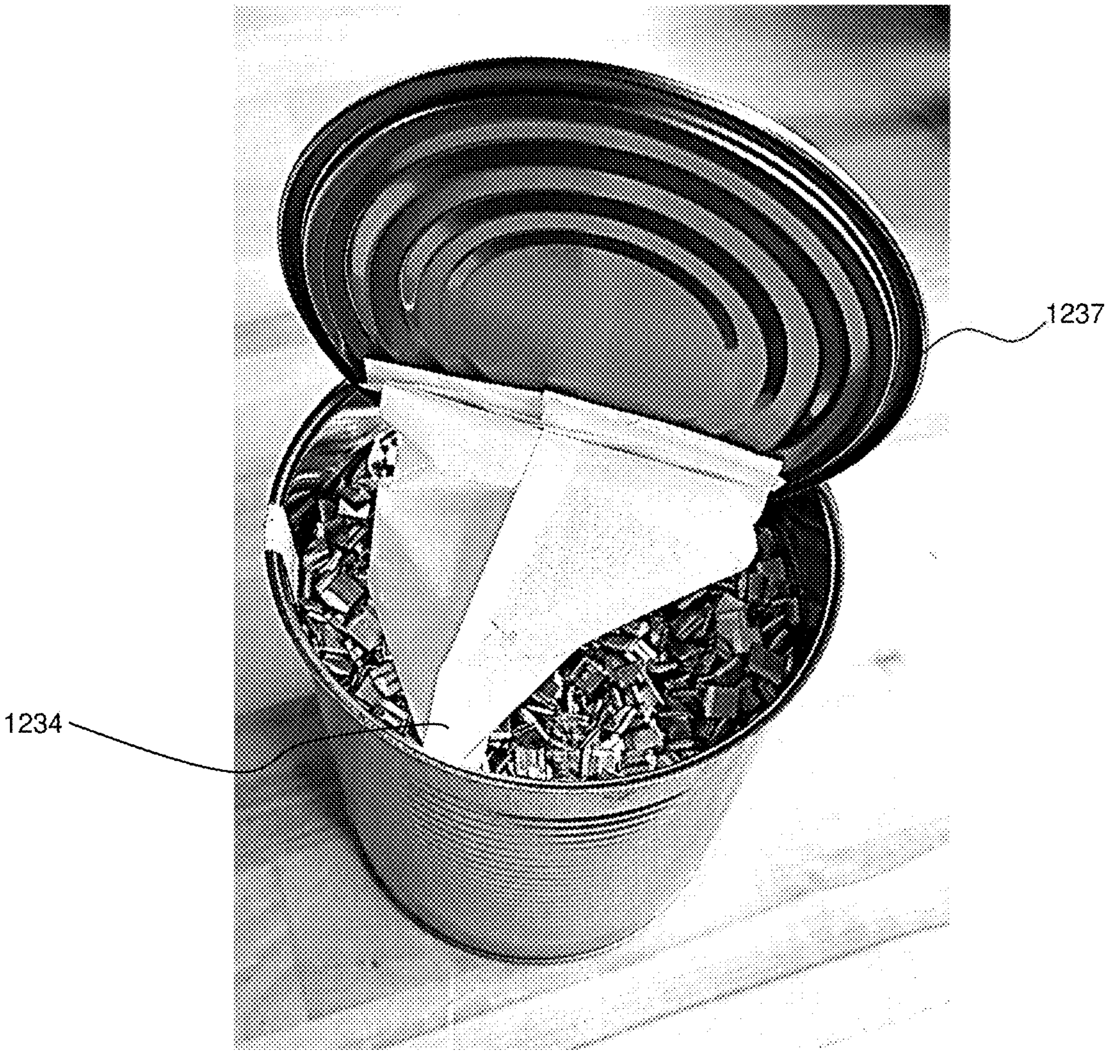
FIG. 12B is a perspective view of the kit of material of FIG. 12A, shown with the second end of the bag sealed perpendicular to the first sealed end such that the at least one activating material is contained within the bag.
Figure 12C:
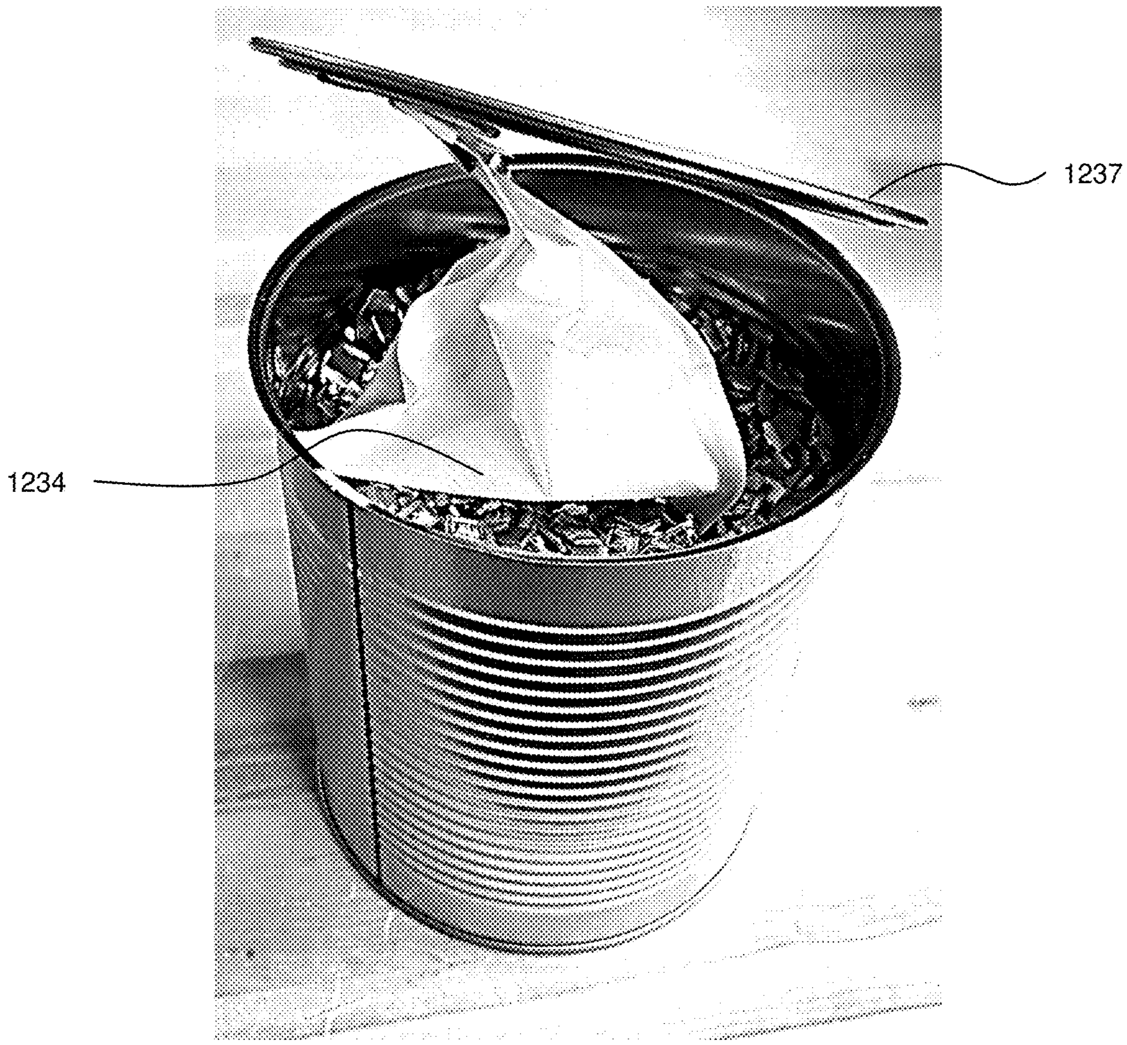
FIG. 12C is a perspective view of the kit of material of FIG. 12A, shown with a portion of the bag stuck to a cover of a container of the kit of material.

As yet another example, referring now to FIGS. 12A-FIG. 11A shows a pod 1234 at least partially formed of glassine paper, which is a specialized form of paper that is nonporous and often used for packaging greasy or oily food products like pastries. The pod 1234 may be pre-assembled with a single open end for inserting goods, where the factory end and edges are fully sealed to contain the activating agent even if it is liquid or solid. An open end may be folded parallel to the factory closed end. The ends may be sealed with an adhesive that loses strength completely at or above about 100° C., such as most industrial paper packaging glues.

The pod 1234 may be secured to a first cover 1237 such that, upon removal of the first cover 1237, the pod 1234 may be removed as well, as may be useful for keeping the plurality of chips free of debris during use. The connection between the pod 1234 and the first cover 1237 may be achieved mechanically, (e.g., a fold or a slot to anchor the paper container) or via an adhesive (e.g., a high temperature epoxy). The pod 1234 may also, or instead, be spot welded onto the first cover 1237 during a manufacturing process, such as may be useful for production on a mass scale.

Figure 13A:
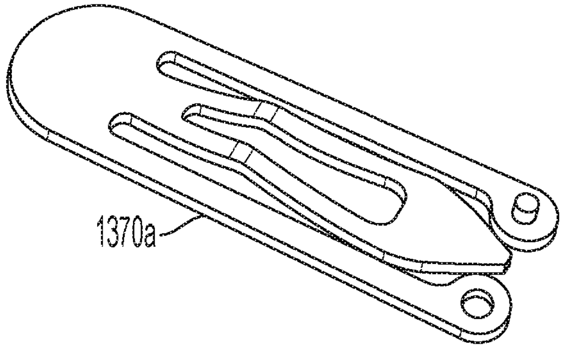
FIG. 13A is a perspective view of a clip for securing a pod to a container in a kit of material.

Referring now to FIG. 13A, a clip 1370*a* may have a bistable structure-having an open position and a closed position and may be spot weldable to the cover of a container. A pod may be pinched by the clip 1370 so that the pod may remain attached to the cover of the container during treatment and further, or instead, may be removed with the cover after the container is opened, thus reducing the likelihood of paper becoming mixed with the activated aluminum.

Figure 13B:
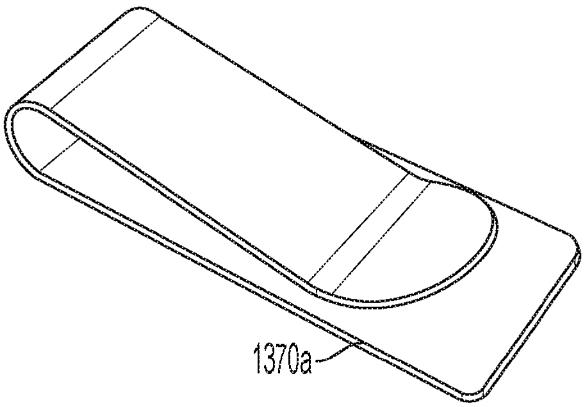
FIG. 13B is a perspective view of a clip for securing a pod to a container in a kit of material.

Referring now to FIG. 13B, a clip 1370*b* may be restraint that is not bistable, and constantly applies spring force on the container 700 when a pod is inserted into the clip to prevent the pod from sliding out.

Figure 13C:
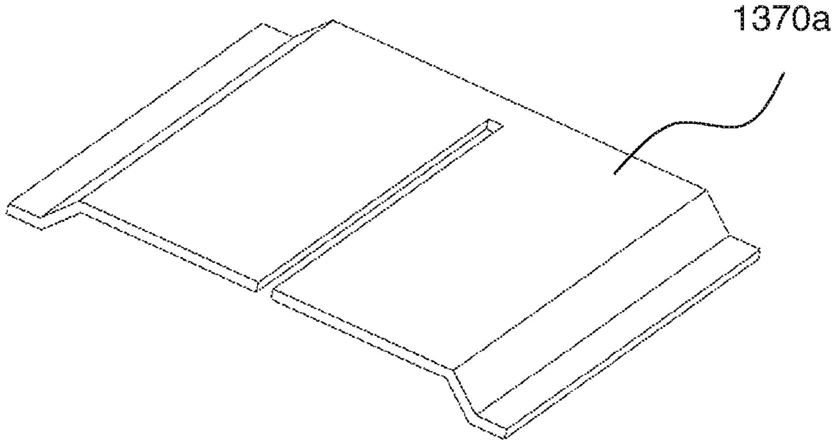
FIG. 13C is a perspective view of a clip for securing a pod to a container in a kit of material.

Referring now to FIG. 13C, a clip 1370*c* may have a slotted, which may be spring-loaded in some instances. The gap of the slot may be sized so that the pod may be slid into the slot, and the compression of the pod creates a preload that holds the pod in place, in addition to folds of the pod geometrically constraining the pod from falling out of the slot.

As yet another example, while thermal reactors have been generally described as providing heating, other implementations are additionally or alternatively possible. For example, unless otherwise specified or made clear from the context, it shall be appreciated that any one or more of the various different thermal reactors described herein may be operated as a cooling system instead of heating. Temperature ranges for such cooling may be, for example, below 15° C.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A kit of material processable to form containerized activated aluminum, the kit comprising:

a plurality of chips including a cold-worked aluminum alloy that is plastically deformed and non-recrystallized;

at least one activating material;

a pod containing the at least one activating material; and a container defining a volume fluidically sealed, by an openable cover, from an outside environment, the pod separating the at least one activating material from the plurality of chips within the volume and, via energy directed to the plurality of chips, the at least one activating material releasable from the pod onto the plurality of chips to form the cold-worked aluminum alloy into activated aluminum.

2. The kit of material of claim 1, wherein the at least one activating material includes tin.

3. The kit of material of claim 1, wherein the at least one activating material includes a mineral.

4. The kit of material of claim 1, wherein the at least one activating material includes indium.

5. The kit of material of claim 1, wherein the at least one activating material includes gallium.

6. The kit of material of claim 1, wherein the at least one activating material is gallium-free.

7. The kit of material of claim 1, wherein the at least one activating material includes an alloy.

8. The kit of material of claim 1, wherein the at least one activating material includes ceramic powder.

9. The kit of material of claim 1, wherein the at least one activating material has a melting temperature below a melting temperature of the cold-worked aluminum alloy.

10. The kit of material of claim 1, wherein weight of the at least one activating material is about 1-15% of the weight of the plurality of chips.

11. The kit of material of claim 1, wherein the at least one activating material releasable from the pod onto the plurality of chips is diffusible along grain boundaries and internal dislocations of the plurality of chips to form the cold-worked aluminum alloy into activated aluminum.

12. The kit of material of claim 1, wherein the at least one activating material is heatable in the pod.

13. The kit of material of claim 1, wherein the at least one activating material is liquid in the pod.

14. The kit of material of claim 1, wherein the pod is thermally activatable at a temperature of greater than about 100° C. and less than 340° C. to release the at least one activating material from the pod onto the plurality of chips.

15. The kit of material of claim 1, wherein the pod is fracturable to release the at least one activating material from the pod onto the plurality of chips.

16. The kit of material of claim 1, wherein the container is inert with respect to the cold-worked aluminum alloy and the at least one activating material.

17. The kit of material of claim 1, wherein the cold-worked aluminum alloy includes an aluminum oxide layer penetrable by the at least one activating material released from the pod.

18. The kit of material of claim 1, further comprising grinding media in the volume of the container.

* * * * *